US008086647B2

(12) United States Patent
Dettinger et al.

(10) Patent No.: US 8,086,647 B2
(45) Date of Patent: Dec. 27, 2011

(54) SEQUENCED MODIFICATION OF MULTIPLE ENTITIES BASED ON AN ABSTRACT DATA REPRESENTATION

(75) Inventors: Richard D. Dettinger, Rochester, MN (US); Jennifer L. LaRocca, Rochester, MN (US); Richard J. Stevens, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 714 days.

(21) Appl. No.: 12/122,491

(22) Filed: May 16, 2008

(65) Prior Publication Data

US 2008/0215612 A1    Sep. 4, 2008

Related U.S. Application Data

(63) Continuation of application No. 10/403,960, filed on Mar. 31, 2003, now Pat. No. 7,398,263, which is a continuation-in-part of application No. 10/083,075, filed on Feb. 26, 2002, now Pat. No. 6,996,558.

(51) Int. Cl.
*G06F 7/00* (2006.01)
(52) U.S. Cl. ..................... 707/803
(58) Field of Classification Search .................. 707/803
See application file for complete search history.

(56) References Cited

U.S. PATENT DOCUMENTS

| | | | |
|---|---|---|---|
| 5,253,362 A | 10/1993 | Nolan et al. | |
| 5,345,586 A | 9/1994 | Hamala et al. | |
| 5,369,778 A | 11/1994 | San Soucie et al. | |
| 5,506,984 A | 4/1996 | Miller | |
| 5,592,663 A | 1/1997 | Nagamori | |
| 5,630,121 A | 5/1997 | Braden-Harder et al. | |
| 5,701,453 A | 12/1997 | Maloney et al. | |
| 5,725,227 A | 3/1998 | Mayer | |
| 5,734,887 A | 3/1998 | Kingberg et al. | |
| 5,918,232 A | 6/1999 | Pouschine et al. | |
| 5,943,666 A | 8/1999 | Kleewein et al. | |
| 5,987,446 A | 11/1999 | Corey et al. | |
| 6,009,422 A | 12/1999 | Ciccarelli | |
| 6,226,650 B1 | 5/2001 | Mahajan et al. | |
| 6,233,586 B1 | 5/2001 | Chang et al. | |
| 6,457,003 B1 | 9/2002 | Gajda et al. | |
| 6,457,009 B1 | 9/2002 | Bollay | |
| 6,460,043 B1 | 10/2002 | Tabbara et al. | |
| 6,553,368 B2 | 4/2003 | Martin et al. | |
| 6,601,065 B1 | 7/2003 | Nelson et al. | |

(Continued)

OTHER PUBLICATIONS

IBM, "IBM Data Discovery and Query Builder Data Abstraction Model Reference Guide", 2004, IBM, 114 pages.*

(Continued)

*Primary Examiner* — Wilson Lee
*Assistant Examiner* — Michael Le
(74) *Attorney, Agent, or Firm* — Patterson & Sheridan LLP

(57) ABSTRACT

The present invention is generally directed to a system, method and article of manufacture for modifying data represented abstractly through an abstraction model. In one embodiment, a data repository abstraction layer provides a logical view of an underlying data repository that is independent of the particular manner of data representation. A query abstraction layer is also provided and is based on the data repository abstraction layer. A runtime component performs transformation of an abstract query into a form that can be used against a particular physical data representation. The transformation includes ordering physical modification operations according to a physical entity relationships specification to ensure that the physical modification operations are executed in an appropriate order.

25 Claims, 20 Drawing Sheets

U.S. PATENT DOCUMENTS

| | | | |
|---|---|---|---|
| 6,609,123 | B1 | 8/2003 | Cazemier et al. |
| 6,611,838 | B1 | 8/2003 | Ignat et al. |
| 6,725,227 | B1 | 4/2004 | Li |
| 6,803,927 | B1 | 10/2004 | Sahoo |
| 6,820,076 | B2 | 11/2004 | Bailey et al. |
| 6,928,431 | B2 | 8/2005 | Dettinger et al. |
| 6,954,748 | B2 | 10/2005 | Dettinger et al. |
| 6,996,558 | B2 | 2/2006 | Dettinger et al. |
| 7,096,229 | B2 | 8/2006 | Dettinger et al. |
| 7,398,263 | B2 | 7/2008 | Dettinger et al. |
| 2001/0016843 | A1 | 8/2001 | Olson et al. |
| 2001/0037345 | A1 | 11/2001 | Kiernan et al. |
| 2002/0032676 | A1 | 3/2002 | Reiner et al. |
| 2002/0078068 | A1 | 6/2002 | Krishnaprasad et al. |
| 2002/0091702 | A1 | 7/2002 | Mullins |
| 2002/0123984 | A1 | 9/2002 | Prakash |
| 2003/0167274 | A1 | 9/2003 | Dettinger et al. |
| 2003/0172056 | A1 | 9/2003 | Dettinger et al. |
| 2003/0208486 | A1 | 11/2003 | Dettinger et al. |
| 2003/0212666 | A1 | 11/2003 | Basu et al. |
| 2003/0220893 | A1 | 11/2003 | Dettinger et al. |
| 2004/0088561 | A1 | 5/2004 | Dettinger et al. |
| 2004/0172305 | A1 | 9/2004 | Soerensen et al. |
| 2005/0075996 | A1 | 4/2005 | Dettinger et al. |
| 2006/0010127 | A1 | 1/2006 | Dettinger et al. |
| 2008/0215611 | A1 | 9/2008 | Dettinger et al. |

OTHER PUBLICATIONS

Lerm et al., "Cooperative access to relational and object-oriented federated databases," *IEEE Proceedings of the Fourth Workshop on Future trends of Distributed Computing Systems*, Sep. 1993; pp. 222-227.

Llama, "Search Code: Search Your Database," <http://www.codewalkers.com/c/a/Search-Code/Search-Your-Database/>, retrieved Mar. 23, 2009, pp. 1-4.

Meng et al., "A Theory of Translation From Relational Queries to Hierarchical Queries," *IEEE Transactions on Knowledge and Data Engineering*, Apr. 1995, vol. 7(2): pp. 228-245.

Office Action History for U.S. Appl. No. 10/083,075 from Nov. 26, 2004 to Sep. 1, 2005.

Office Action History for U.S. Appl. No. 11/226,181 from Mar. 25, 2009 to Aug. 10, 2010.

Office Action History for U.S. Appl. No. 10/132,228 from Sep. 23, 2004 to Mar. 16, 2005.

Office Action History for U.S. Appl. No. 10/131,984 from Sep. 23, 2004 to May 19, 2005.

Office Action History for U.S. Appl. No. 10/403,366 from Feb. 3, 2006 to Oct. 4, 2010.

Office Action History for U.S. Appl. No. 10/403,960 from Apr. 7, 2006 to May 30, 2008.

*The American Heritage College Dictionary*, 2004, Houghton & Mifflin, Fourth Edition: p. 977.

Office Action for U.S. Appl. No. 11/226,181 dated Feb. 11, 2011.

Final Office Action for U.S. Appl. No. 10/403,366 dated Feb. 8, 2011.

Michael Rys, "Bringing the Internet to Your Database: Using SQL Server 2000 and XML to Build Loosely-Coupled Systems," Microsoft Corporation (http://www.microsoft.com/sql), pp. 465-472, 2001.

Rahm, et al., "A Survey of Approaches to Automatic Schema Matching," The VLDB Journal 10:334-350 (2001)/Digital Object Identifier (DOI) 10.1007/S007780100057.

Jacques Calmet et al., A generic query-translation framework for a mediator architecture, Proceedings of the Thirteenth International Conference on Data Engineering, Apr. 1997, pp. 434-443, IEEE Computer Society, Washington, DC, United States.

Notice of Allowance dated Jul. 14, 2011 for U.S. Appl. No. 11/226,181.

Office Action dated Mar. 21, 2011 for U.S. Appl. No. 12/122,354.

\* cited by examiner

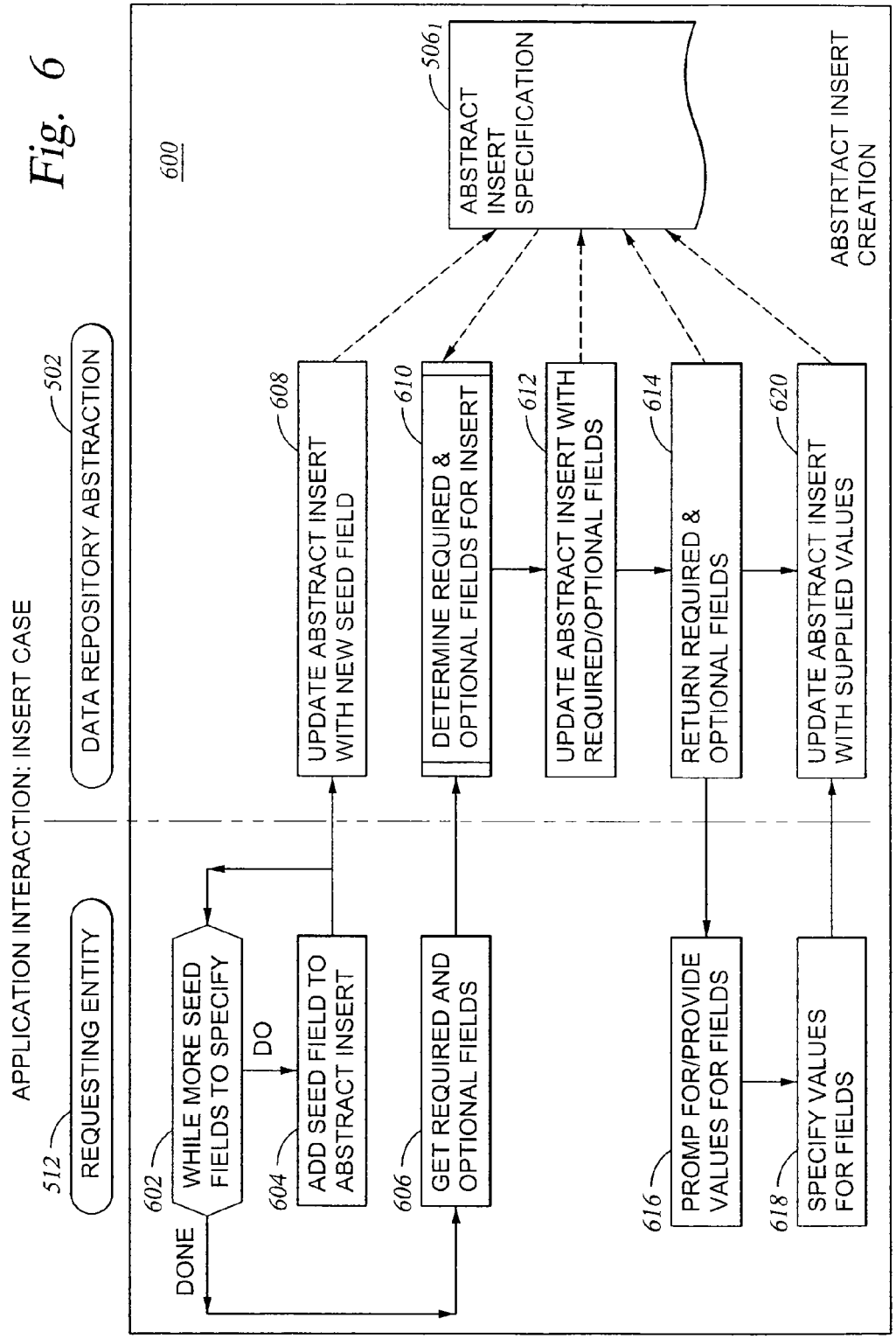

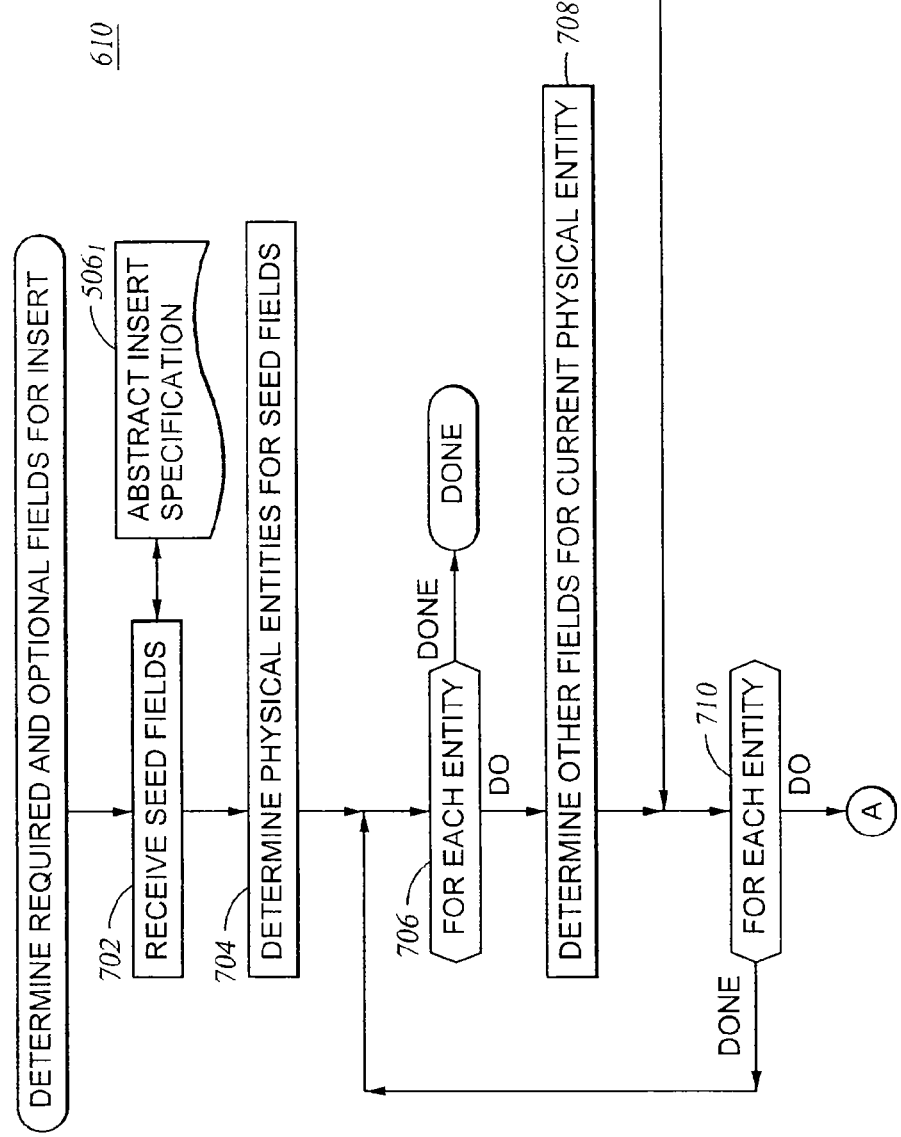

CREATE ABSTRACT INSERT

SELECTED INITIAL FIELDS TO INSERT: — 1702
- Patient ID
- First Name
- Last Name
- Birth Date
- Gender
- Street
- City
- State
- Postal Code
- Test Date
- Glucose Test
- Account Number
- Balance
- ...

SELECTED FIELDS: — 1704
- Last Name
- State

NEXT >> — 1706

CREATE ABSTRACT INSERT

ENTER VALUES TO INSERT (* = REQUIRED):

Last Name (*) — 1902A
State (*) — 1902B
First Name (*) — 1902C
Patient ID  34982 — 1902D
Birth Date — 1902E
Gender — 1902F
Street — 1902G
City — 1902H
Postal Code — 1902I

NEXT >>

CREATE ABSTRACT INSERT

ENTER VALUES TO INSERT (* = REQUIRED):

Last Name (*) | McGoon
State (*) | Ohio
First Name (*) | Mary
Patient ID | 34982
Birth Date | 09/01/59
Gender | Female
Street | 205 1st
City | Toledo
Postal Code | 43601

NEXT >>

*Fig. 20*

SEQUENCED MODIFICATION OF MULTIPLE ENTITIES BASED ON AN ABSTRACT DATA REPRESENTATION

CROSS-REFERENCE TO RELATED APPLICATIONS

This application is a continuation of U.S. patent application Ser. No. 10/403,960, filed Mar. 31, 2003 now U.S. Pat. No. 7,398,263, which is a continuation-in-part of U.S. patent application Ser. No. 10/083,075, filed Feb. 26, 2002, and issued as U.S. Pat. No. 6,996,558 Feb. 7, 2006, each of which is hereby incorporated herein in its entirety.

BACKGROUND OF THE INVENTION

1. Field of the Invention

The present invention generally relates to data processing, and more particularly, to the modification of data through a logical framework.

2. Description of the Related Art

In commonly assigned U.S. patent application Ser. No. 10/083,075 (the '075 application), filed Feb. 26, 2002 entitled "Improved Application Flexibility Through Database Schema and Query Abstraction", a framework was disclosed for logically viewing physical data. The framework of the '075 application provided a requesting entity (i.e., an end-user or application) with an abstract representation of physical data. In this way, the requesting entity is decoupled from the underlying physical data to be accessed. Logical queries based on the framework can be constructed without regard for the makeup of the physical data. Further, changes to the physical data do not necessitate changes to applications accessing the physical data.

In addition to accessing abstractly represented physical data (i.e., issuing queries against the data to receive results), it is desirable to modify (i.e., insert, update and delete) data based on the abstract data representation. However, changing a data repository requires a significant amount of knowledge about the underlying database schema. In a relational database, modifications to the database must be performed on a single table basis and a detailed knowledge about the column formats and applicable values is necessary. To ensure data integrity, database modifications must account for relationships between database tables (such as primary key/foreign key relationships) and must account for requirements that tables be updated in a certain order. In the case of an abstracted database, the knowledge for dealing with such lower-level logical operations must also be abstracted. Otherwise, the knowledge must be accounted for at the application level, thereby undermining a primary advantage achieved by abstract representation of data.

Therefore, what is needed is the ability to modify data based on an abstract data representation.

SUMMARY OF THE INVENTION

The present invention provides a method, system and article of manufacture for defining the capabilities for performing multiple modification operations against data in a data repository based on a single abstract modification operation.

One embodiment provides a method of providing a logical framework for defining abstract modification operations for modifying physical data comprising a plurality of physical entities. The method includes providing an abstract model for defining abstract modification specifications logically describing operations to modify the data, where the abstract model includes a plurality of logical fields; a mapping rule for each of the plurality of logical fields, which map each of the plurality of logical fields to at least one of the physical entities of the data; and a physical entity relationships specification defining interrelationships between physical entities of the data. The method further includes providing a run-time component to transform, according to the abstract model, a single abstract modification specification into at least two separate physical modification specifications consistent with the physical data, wherein each physical modification specification modifies a different physical entity of the data.

Another embodiment provides a method for performing operations for modifying physical data comprising a plurality of physical entities and having a particular physical data representation in a database. The method includes receiving user input via a user interface, the input logically describing a single abstract modification operation to modify the data; building at least two physical modification statements corresponding to the single abstract modification operation, wherein each of the at least two physical modification statements modifies a different physical entity of the data; ordering the at least two physical modification statements; and executing modification operations according to the physical modification statements, whereby the data is modified.

Yet another embodiment provides a computer-readable medium containing a program which, when executed by a processor, performs operations for modifying physical data comprising a plurality of physical entities and having a particular physical data representation in a database. The operation includes generating a single abstract modification specification abstractly defining modification operations to modify the data, wherein the abstract modification specification comprises a plurality of logical fields corresponding to physical entities of the database; transforming the abstract modification specification into at least two physical modification statements consistent with the particular physical data representation according to mapping rules which map the logical fields corresponding to the physical entities, wherein each of the at least two physical modification statements modifies a different physical entity of the data; ordering the at least two physical modification statements; and executing the modification operations according to the physical modification statements, whereby the data is modified.

Yet another embodiment provides a computer-readable medium containing a user interface program which, when executed by a processor, performs an operation for creating an abstract modification specification abstractly defining modification operations to modify physical data in a database containing a plurality of physical entities. The operation comprises displaying a selection field and populating the selection field with a plurality of logical fields from which a user selects two or more logical fields to be used as seed fields in determining related logical fields, wherein each logical field corresponds to a physical entity in the database. Selections of at least two logical fields from the selection field are received, wherein each of the logical fields corresponds to a separate physical entity in the database. Based on the selection of the at least two logical fields, related logical fields for each of the at least two logical fields are determined, and input fields for each of the selected logical fields and the related logical fields are displayed, wherein the input fields include required fields necessary to perform the abstract modification specification.

Still another embodiment provides a computer-readable medium containing a program which, when executed by a processor, provides a logical framework for defining abstract modification operations for modifying physical data. The program includes an abstract model for defining an abstract modification specification logically describing operations to modify the data, the abstract model comprising: (i) a plurality of logical fields; (ii) mapping rule for each of the plurality of logical fields, which map the plurality of logical fields to physical entities of the data; and (iii) a physical entity relationships specification defining interrelationships between the physical entities of the data. A run-time component is provided to (i) transform the abstract modification specification into at least two physical modification statements consistent with the physical data, wherein each of the at least two physical modification statements modifies a different physical entity of the data; and (ii) order the at least two physical modification statements according to the physical entity relationships specification.

Still another embodiment provides a computer comprising a memory and at least one processor, and further comprising a logical framework for defining abstract modification operations for modifying physical data, the logical framework including an abstract model for defining an abstract modification specification logically describing an operation to modify the data, and a run-time component to convert the abstract modification specification into a physical counterpart. The abstract model includes (i) a plurality of logical fields; (ii) a mapping rule for each of the plurality of logical fields, which map the plurality of logical fields to physical entities of the data; and (iii) a physical entity relationships specification defining interrelationships between the physical entities of the data. The run-time component transforms the abstract modification specification into at least two physical modification statements consistent with the physical data and then orders the at least two physical modification statements according to the physical entity relationships specification, wherein each of the at least two physical modification statements modifies a different physical entity of the data. The run-time component may then submit the physical modification statements for execution.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 6 is a flow chart illustrating the generation of an abstract insert specification used to implement an insert operation against physical data.

FIG. 14 is a flow chart illustrating generation of an abstract delete specification used to implement a delete operation against physical data delete operation.

FIG. 18 is the user interface screen of FIG. 17 after being populated with selections (seed fields) made from a logical field menu.

FIG. 19 is a screen configured with a plurality of input fields selected according to the seed field selections made from the user interface screen of FIG. 18.

FIG. 20 is the screen of FIG. 19 after having been populated with values input by a user, as well as a generated value.

DETAILED DESCRIPTION OF THE PREFERRED EMBODIMENTS

Introduction

Figure 1:
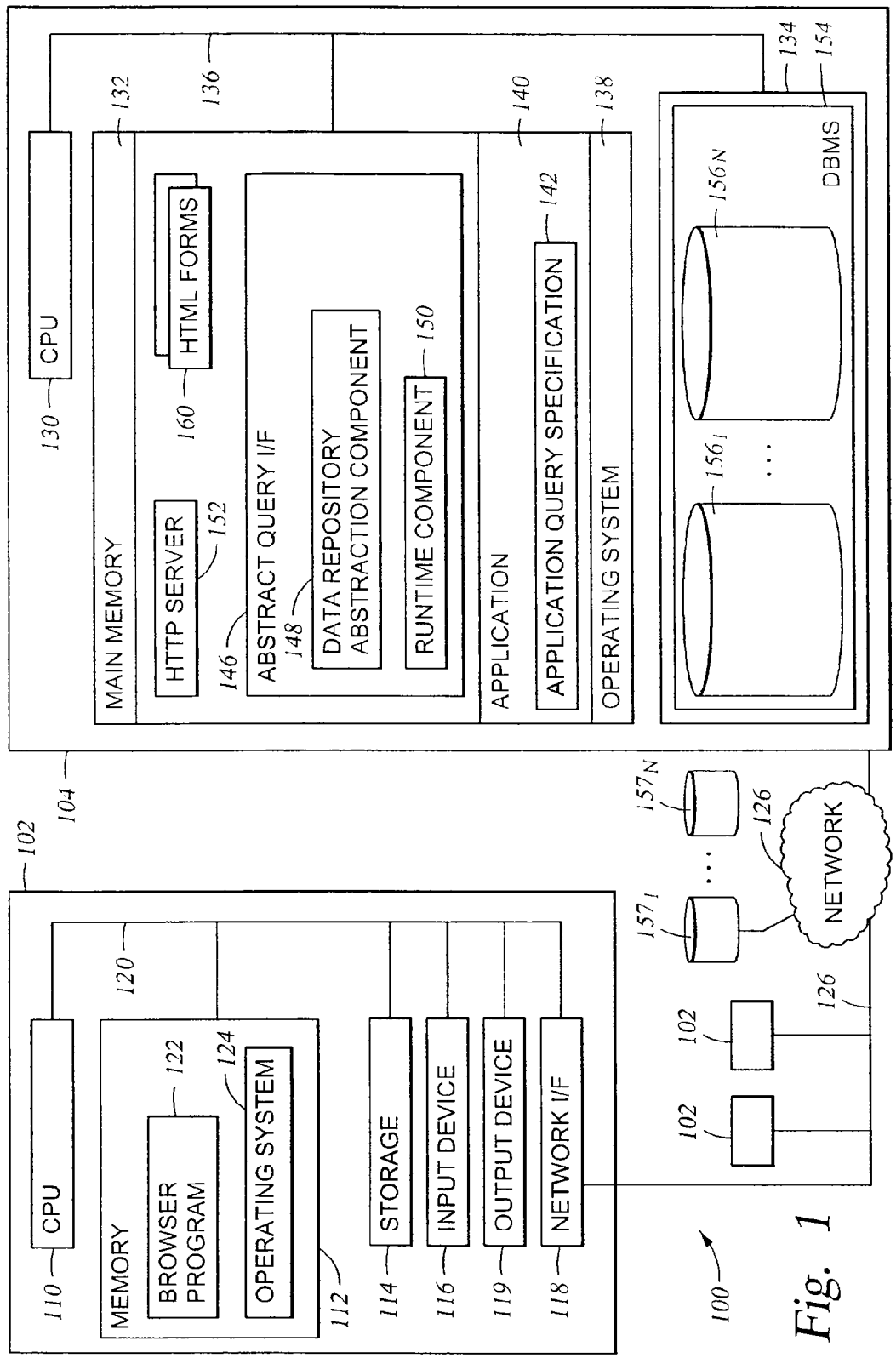
FIG. 1 is a block diagram of an illustrative computer architecture.

The present invention provides a method, system and article of manufacture for defining the capabilities for performing multiple modification operations against data in a data repository based on a single abstract modification operation.

One embodiment of the invention is implemented as a program product for use with a computer system and described below. The program(s) of the program product defines functions of the embodiments (including the methods described herein) and can be contained on a variety of signal-bearing media. Illustrative signal-bearing media include, but are not limited to: (i) non-writable storage media (e.g., read-only memory devices within a computer such as CD-ROM disks readable by a CD-ROM drive) on which information is permanently stored; or (ii) writable storage media (e.g., floppy disks within a diskette drive or hard-disk drive) on which alterable information is stored. The embodiments specifically include information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machinereadable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

In one embodiment, a particular data definition framework (referred to herein as a data repository abstraction (DRA) layer/component) is provided for accessing and modifying (inserting, updating or deleting) data independent of the particular manner in which the data is physically represented. The data may be located in a single repository (i.e., source) of data or a plurality of different data repositories. Thus, the data definition framework may provide a logical view of one or more underlying data repositories. By using an abstract representation of a data repository, the underlying physical representation can be more easily changed or replaced without affecting the application making the changes. Instead, the abstract data representation is changed with no changes required by the application. In addition, multiple abstract data representations can be defined to support different applications against the same underlying database schema that may have different default values or required fields.

Co-pending U.S. patent application Ser. No. 10/403,366, filed Mar. 31, 2003, entitled "MODIFICATION OF A DATA REPOSITORY BASED ON AN ABSTRACT DATA REPRESENTATION", describes the modification of data by building insert, update and delete operation (referred to as a modification operations) based on an abstract representation of physical data. The present application provides additional functionality to support multiple database operations. That is, embodiments are provided for modifying physical data via a single logical operation spanning multiple statements (e.g., multiple SQL statements) issued against the physical data. In this regard, the sequence in which the operations should be performed must also be considered. In the current data mining applications based on SQL, for example, the application is required to have the knowledge of order dependencies between operations. An aspect of the present invention decouples this knowledge from the application.

In other aspects the user's efforts in determining what data is required or optional for inserting, updating or deleting data from a physical data repository is facilitated. The knowledge of underlying database semantics for related fields and which fields are required or optional for a given operation is removed. Information is passed back to the application to indicate required, optional, and default values and thus not required to be hard coded into the application itself. The invention also provides guidance to the application on how to gather the necessary information to perform a particular operation.

Thus, embodiments are provided in which the underlying operations against the physical data are managed to ensure data integrity by addressing the issues of related fields and operations, issues involving the ordering in which operations are performed, and issues relating to transactional support.

Physical View of Environment

FIG. 1 depicts a block diagram of a networked system 100 in which embodiments of the present invention may be implemented. In general, the networked system 100 includes a client (i.e., generally any requesting entity such as a user or application) computer 102 (three such client computers 102 are shown) and at least one server computer 104 (one such server computer 104 is shown). The client computer 102 and the server computer 104 are connected via a network 126. In general, the network 126 may be a local area network (LAN) and/or a wide area network (WAN). In a particular embodiment, the network 126 is the Internet. However, it is noted that aspects of the invention need not be implemented in a distributed environment. As such, the client computers 102 and the server computer 104 are more generally representative of any requesting entity (such as a user or application) issuing queries and a receiving entity configured to handle the queries, respectively.

The client computer 102 includes a Central Processing Unit (CPU) 110 connected via a bus 120 to a memory 112, storage 114, an input device 116, an output device 119, and a network interface device 118. The input device 116 can be any device to give input to the client computer 102. For example, a keyboard, keypad, light-pen, touch-screen, track-ball, or speech recognition unit, audio/video player, and the like could be used. The output device 119 can be any device to give output to the user, e.g., any conventional display screen. Although shown separately from the input device 116, the output device 119 and input device 116 could be combined. For example, a display screen with an integrated touch-screen, a display with an integrated keyboard, or a speech recognition unit combined with a text speech converter could be used.

The network interface device 118 may be any entry/exit device configured to allow network communications between the client computer 102 and the server computer 104 via the network 126. For example, the network interface device 118 may be a network adapter or other network interface card (NIC).

Storage 114 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 112 and storage 114 could be part of one virtual address space spanning multiple primary and secondary storage devices.

The memory 112 is preferably a random access memory sufficiently large to hold the necessary programming and data structures of the invention. While the memory 112 is shown as a single entity, it should be understood that the memory 112 may in fact comprise a plurality of modules, and that the memory 112 may exist at multiple levels, from high speed registers and caches to lower speed but larger DRAM chips.

Illustratively, the memory 112 contains an operating system 124. Illustrative operating systems, which may be used to advantage, include Linux and Microsoft's Windows®. More generally, any operating system supporting the functions disclosed herein may be used.

The memory 112 is also shown containing a browser program 122 that, when executed on CPU 110, provides support for navigating between the various servers 104 and locating network addresses at one or more of the servers 104. In one embodiment, the browser program 122 includes a web-based Graphical User Interface (GUI), which allows the user to display Hyper Text Markup Language (HTML) information. More generally, however, the browser program 122 may be any GUI-based program capable of rendering the information transmitted from the server computer 104.

The server computer 104 may be physically arranged in a manner similar to the client computer 102. Accordingly, the server computer 104 is shown generally comprising a CPU 130, a memory 132, and a storage device 134, coupled to one another by a bus 136. Memory 132 may be a random access memory sufficiently large to hold the necessary programming and data structures that are located on the server computer 104.

The server computer 104 is generally under the control of an operating system 138 shown residing in memory 132. Examples of the operating system 138 include IBM OS/400®, UNIX, Microsoft Windows®, and the like. More generally, any operating system capable of supporting the functions described herein may be used.

The memory 132 further includes one or more applications 140 and an abstract query interface 146. The applications 140 and the abstract query interface 146 are software products comprising a plurality of instructions that are resident at various times in various memory and storage devices in the computer system 100. When read and executed by one or more processors 130 in the server 104, the applications 140 and the abstract query interface 146 cause the computer system 100 to perform the steps necessary to execute steps or elements embodying the various aspects of the invention. The applications 140 (and more generally, any requesting entity, including the operating system 138 and, at the highest level, users) issue queries against a database. Illustrative sources against which queries may be issued include local databases $156_1 \ldots 156_N$, and remote databases $157_1 \ldots 157_N$, collectively referred to as database(s) 156-157). Illustratively, the databases 156 are shown as part of a database management system (DBMS) 154 in storage 134. More generally, as used herein, the term "databases" refers to any collection of data regardless of the particular physical representation. By way of illustration, the databases 156-157 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data which is described by a data definition framework such as the DRA described herein.

In one embodiment, the queries issued by the applications 140 are defined according to an application query specification 142 included with each application 140. The queries issued by the applications 140 may be predefined (i.e., hard coded as part of the applications 140) or may be generated in response to input (e.g., user input). In either case, the queries (referred to herein as "abstract queries") are composed using logical fields defined by the abstract query interface 146. In particular, the logical fields used in the abstract queries are defined by a data repository abstraction component 148 of the abstract query interface 146. The abstract queries are executed by a runtime component 150 which transforms the abstract queries into a form (referred to herein as a concrete query) consistent with the physical representation of the data contained in one or more of the databases 156-157. The queries may be configured to access the data and return results, or to modify (i.e., insert, delete or update) the data. The application query specification 142 and the abstract query interface 146 are further described with reference to FIGS. 2A-B.

In one embodiment, elements of a query are specified by a user through a graphical user interface (GUI). The content of the GUIs is generated by the application(s) 140. In a particular embodiment, the GUI content is hypertext markup language (HTML) content which may be rendered on the client computer systems 102 with the browser program 122. Accordingly, the memory 132 includes a Hypertext Transfer Protocol (http) server process 152 (e.g., a web server) adapted to service requests from the client computer 102. For example, the process 152 may respond to requests to access a database(s) 156, which illustratively resides on the server 104. Incoming client requests for data from a database 156-157 invoke an application 140. When executed by the processor 130, the application 140 causes the server computer 104 to perform the steps or elements embodying the various aspects of the invention, including accessing the database(s) 156-157. In one embodiment, the application 140 comprises a plurality of servlets configured to build GUI elements, which are then rendered by the browser program 122. Where the remote databases 157 are accessed via the application 140, the data repository abstraction component 148 is configured with a location specification identifying the database containing the data to be retrieved. This latter embodiment will be described in more detail below.

FIG. 1 is merely one hardware/software configuration for the networked client computer 102 and server computer 104. Embodiments of the present invention can apply to any comparable hardware configuration, regardless of whether the computer systems are complicated, multi-user computing apparatus, single-user workstations, or network appliances that do not have non-volatile storage of their own. Further, it is understood that while reference is made to particular markup languages, including HTML, the invention is not limited to a particular language, standard or version. Accordingly, persons skilled in the art will recognize that the invention is adaptable to other markup languages as well as non-markup languages and that the invention is also adaptable future changes in a particular markup language as well as to other languages presently unknown. Likewise, the http server process 152 shown in FIG. 1 is merely illustrative and other embodiments adapted to support any known and unknown protocols are contemplated.

Logical/Runtime View of Environment

Figure 2A:
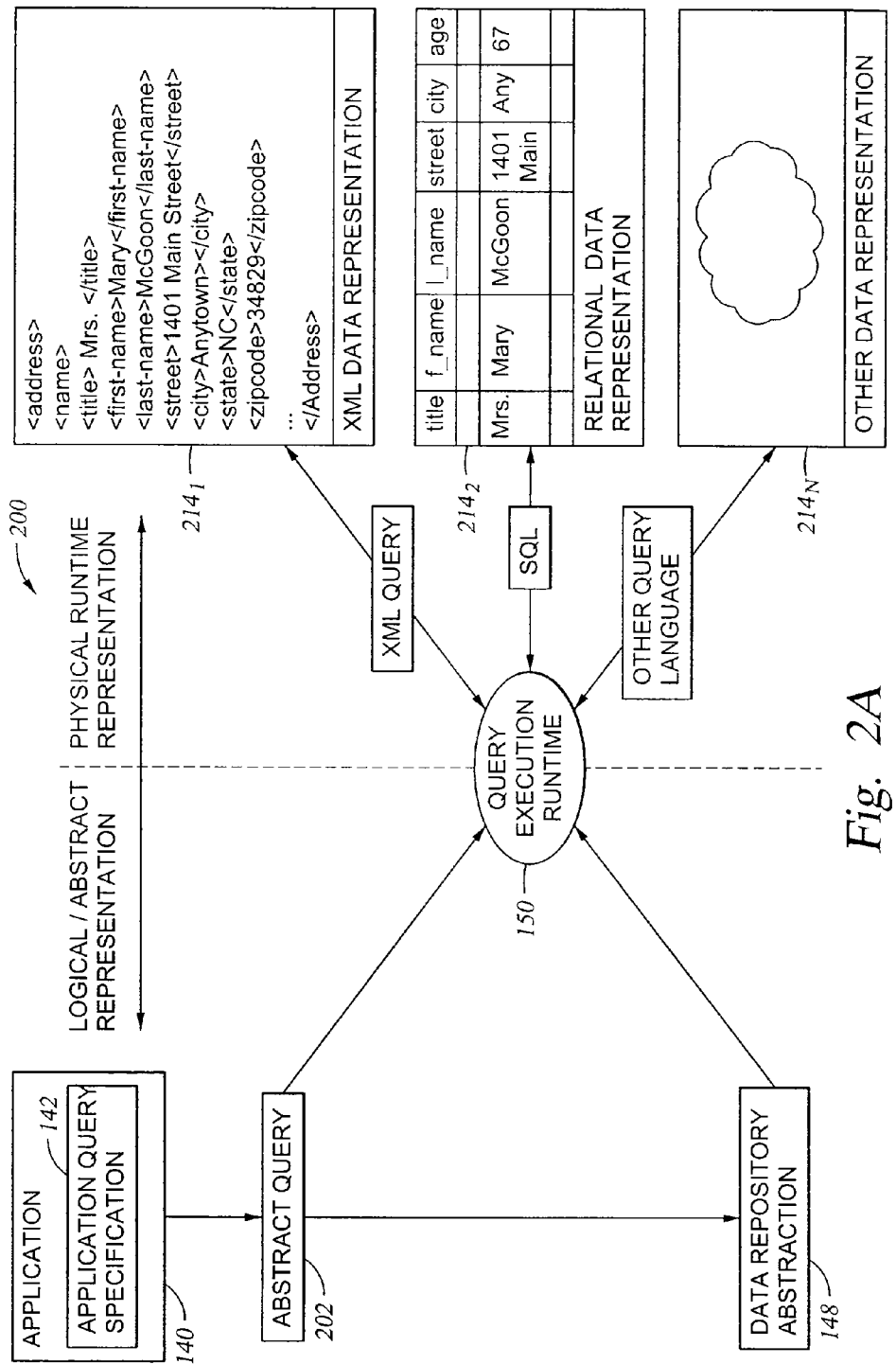
FIG. 2 is a relational view of software components of one embodiment of the invention configured to process queries against a physical data source through an abstract representation of the physical data source.
Figure 2B:
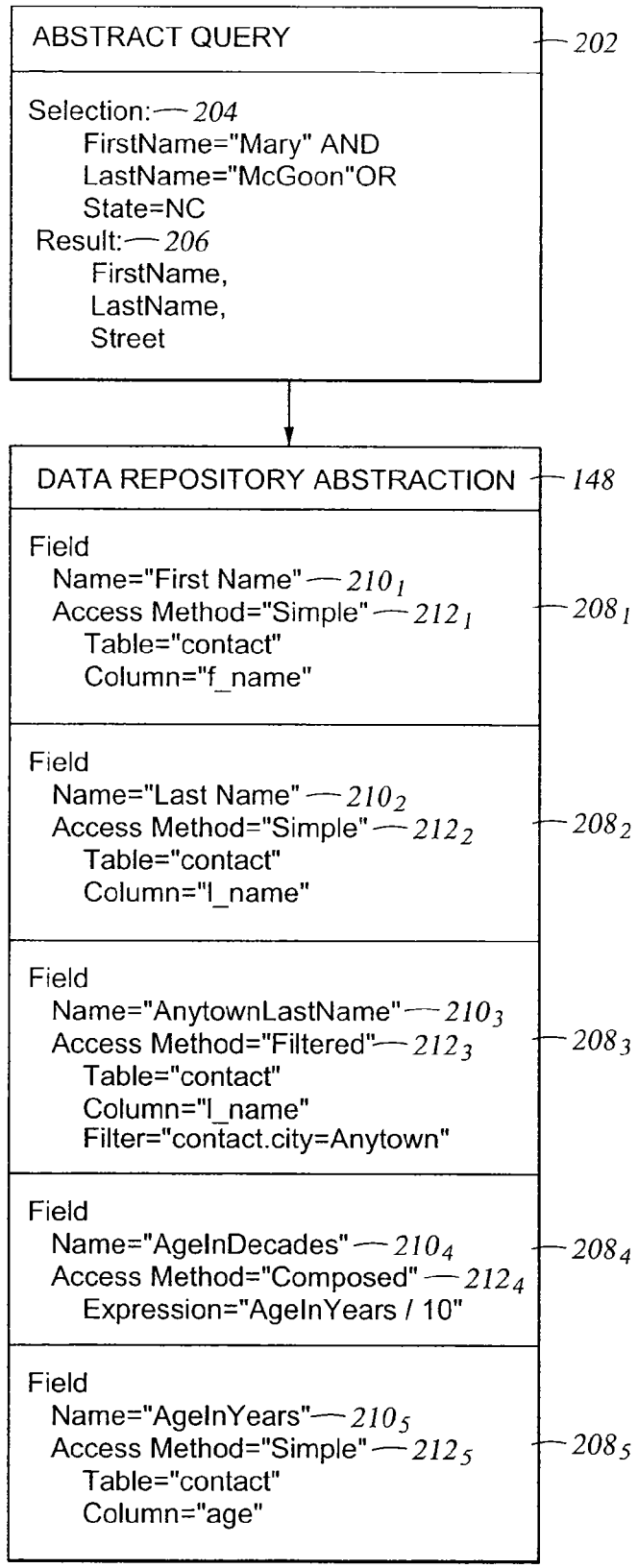

FIGS. 2A-B show a plurality of interrelated components of the invention. The requesting entity (e.g., one of the applications 140) issues a query 202 as defined by the respective application query specification 142 of the requesting entity. The resulting query 202 is generally referred to herein as an "abstract query" because the query is composed according to abstract (i.e., logical) fields rather than by direct reference to the underlying physical data entities in the databases 156-157. As a result, abstract queries may be defined that are independent of the particular underlying data representation used. In one embodiment, the application query specification 142 may include both criteria used for data selection (selection criteria 204) and an explicit specification of the fields to be returned (return data specification 206) based on the selection criteria 204.

The logical fields specified by the application query specification 142 and used to compose the abstract query 202 are defined by the data repository abstraction component 148. In general, the data repository abstraction component 148 exposes information as a set of logical fields that may be used within a query (e.g., the abstract query 202) issued by the application 140 to specify criteria for data selection and specify the form of result data returned from a query operation. The logical fields are defined independently of the underlying data representation being used in the databases 156-157, thereby allowing queries to be formed that are loosely coupled to the underlying data representation.

In general, the data repository abstraction component 148 comprises a plurality of field specifications $208_1, 208_2, 208_3$, $208_4$ and $208_5$ (five shown by way of example), collectively referred to as the field specifications 208. Specifically, a field specification is provided for each logical field available for composition of an abstract query. Each field specification comprises a logical field name $210_1$, $210_2$, $210_3$, $210_4$, $210_5$ (collectively, field name 210) and an associated access method $212_1$, $212_2$, $212_3$, $212_4$, $212_5$ (collectively, access method 212). The access methods associate (i.e., map) the logical field names to a particular physical data representation $214_1$, $214_2$ ... $214_N$ in a database (e.g., one of the databases 156). By way of illustration, two data representations are shown, an XML data representation $214_1$ and a relational data representation $214_2$. However, the physical data representation $214_N$ indicates that any other data representation, known or unknown, is contemplated.

Any number of access methods are contemplated depending upon the number of different types of logical fields to be supported. In one embodiment, access methods for simple fields, filtered fields and composed fields are provided. The field specifications $208_1$, $208_2$ and $208_5$ exemplify simple field access methods $212_1$, $212_2$, and $212_5$, respectively. Simple fields are mapped directly to a particular entity in the underlying physical data representation (e.g., a field mapped to a given database table and column). By way of illustration, the simple field access method $212_1$ shown in FIG. 2B maps the logical field name $210_1$ ("FirstName") to a column named "f_name" in a table named "contact". The field specification $208_3$ exemplifies a filtered field access method $212_3$. Filtered fields identify an associated physical entity and provide rules used to define a particular subset of items within the physical data representation. An example is provided in FIG. 2B in which the filtered field access method $212_3$ maps the logical field name $210_3$ ("AnytownLastName") to a physical entity in a column named "l_name" in a table named "contact" and defines a filter for individuals in the city of Anytown. Another example of a filtered field is a New York ZIP code field that maps to the physical representation of ZIP codes and restricts the data only to those ZIP codes defined for the state of New York. The field specification $208_4$ exemplifies a composed field access method $212_4$. Composed access methods compute a logical field from one or more physical fields using an expression supplied as part of the access method definition. In this way, information which does not exist in the underlying data representation may computed. In the example illustrated in FIG. 2B the composed field access method $212_3$ maps the logical field name $210_3$ "AgeInDecades" to "AgeInYears/10". Another example is a sales tax field that is composed by multiplying a sales price field by a sales tax rate.

It is noted that the data repository abstraction component 148 shown in FIG. 2B is merely illustrative of selected logical field specifications and is not intended to be comprehensive. As such, the abstract query 202 shown in FIG. 2B includes some logical fields for which specifications are not shown in the data repository abstraction component 148, such as "State" and "Street".

It is contemplated that the formats for any given data type (e.g., dates, decimal numbers, etc.) of the underlying data may vary. Accordingly, in one embodiment, the field specifications 208 include a type attribute which reflects the format of the underlying data. However, in another embodiment, the data format of the field specifications 208 is different from the associated underlying physical data, in which case an access method is responsible for returning data in the proper format assumed by the requesting entity. Thus, the access method must know what format of data is assumed (i.e., according to the logical field) as well as the actual format of the underlying physical data. The access method can then convert the underlying physical data into the format of the logical field.

By way of example, the field specifications 208 of the data repository abstraction component 148 shown in FIG. 2A are representative of logical fields mapped to data represented in the relational data representation $214_2$. However, other instances of the data repository abstraction component 148 map logical fields to other physical data representations, such as XML. Further, in one embodiment, a data repository abstraction component 148 is configured with access methods for procedural data representations. One embodiment of such a data repository abstraction component 148 is described below with respect to FIG. 8.

An illustrative abstract query corresponding to the abstract query 202 shown in FIG. 2 is shown in Table I below. By way of illustration, the data repository abstraction 148 is defined using XML. However, any other language may be used to advantage.

TABLE I

QUERY EXAMPLE

```
001  <?xml version="1.0"?>
002  <!--Query string representation: (FirstName = "Mary" AND
       LastName =
003  "McGoon") OR State = "NC"-->
004  <QueryAbstraction>
005    <Selection>
006      <Condition internalID="4">
007        <Condition field="FirstName" operator="EQ" value="Mary"
008  internalID="1"/>
009        <Condition field="LastName" operator="EQ"
             value="McGoon"
010  internalID="3" relOperator="AND"></Condition>
011      </Condition>
012      <Condition field="State" operator="EQ" value="NC"
             internalID="2"
013  relOperator="OR"></Condition>
014    </Selection>
015    <Results>
016      <Field name="FirstName"/>
017      <Field name="LastName"/>
018      <Field name="State"/>
019    </Results>
020  </QueryAbstraction>
```

Illustratively, the abstract query shown in Table I includes a selection specification (lines 005-014) containing selection criteria and a results specification (lines 015-019). In one embodiment, a selection criterion consists of a field name (for a logical field), a comparison operator (=, >, <, etc) and a value expression (what is the field being compared to). In one embodiment, result specification is a list of abstract fields that are to be returned as a result of query execution. A result specification in the abstract query may consist of a field name and sort criteria.

An illustrative instance of a data repository abstraction component 148 corresponding to the abstract query in Table I is shown in Table II below. By way of illustration, the data repository abstraction component 148 is defined using XML. However, any other language may be used to advantage.

TABLE II

DATA REPOSITORY ABSTRACTION EXAMPLE

```
001  <?xml version="1.0"?>
002  <DataRepository>
003    <Category name="Demographic">
004      <Field queryable="Yes" name="FirstName" displayable="Yes">
005        <AccessMethod>
```

TABLE II-continued

DATA REPOSITORY ABSTRACTION EXAMPLE

```
006        <Simple columnName="f_name"
              tableName="contact"></Simple>
007        </AccessMethod>
008        <Type baseType="char"></Type>
009      </Field>
010      <Field queryable="Yes" name="LastName" displayable="Yes">
011        <AccessMethod>
012          <Simple columnName="l_name"
              tableName="contact"></Simple>
013        </AccessMethod>
014        <Type baseType="char"></Type>
015      </Field>
016      <Field queryable="Yes" name="State" displayable="Yes">
017        <AccessMethod>
018          <Simple columnName="state"
              tableName="contact"></Simple>
019        </AccessMethod>
020        <Type baseType="char"></Type>
021      </Field>
022    </Category>
023  </DataRepository>
```

Note that lines 004-009 correspond to the first field specification $208_1$ of the DRA 148 shown in FIG. 2B and lines 010-015 correspond to the second field specification $208_2$. For brevity, the other field specifications defined in Table I have not been shown in FIG. 2B. Note also that Table I illustrates a category, in this case "Demographic". A category is a grouping of one or more logical fields. In the present example, "First Name", "Last Name" and "State" are logical fields belonging to the common category, "Demographic".

Figure 3:
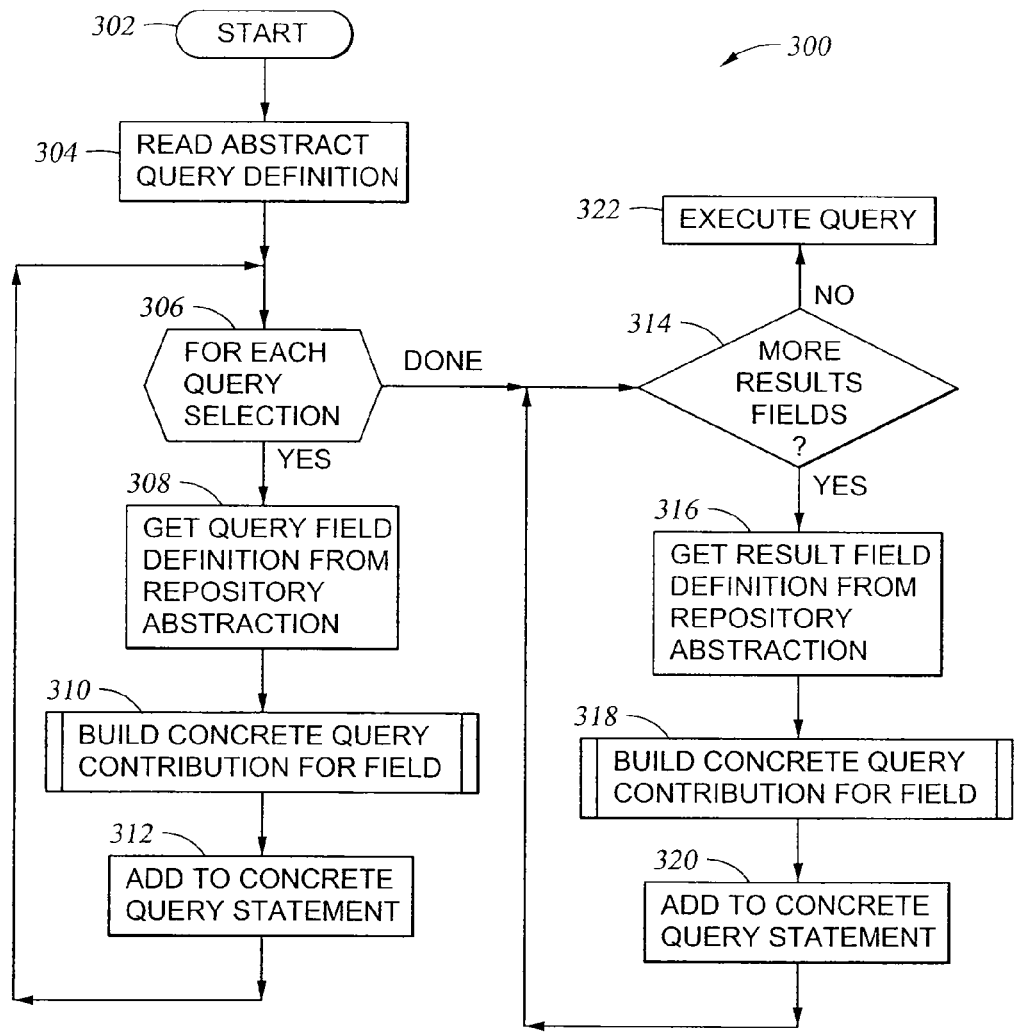
FIG. 3 is a flow chart illustrating the operation of a runtime component.

FIG. 3 shows an illustrative runtime method 300 exemplifying one embodiment of the operation of the runtime component 150. The method 300 is entered at step 302 when the runtime component 150 receives as input an instance of an abstract query (such as the abstract query 202 shown in FIG. 2). At step 304, the runtime component 150 reads and parses the instance of the abstract query and locates individual selection criteria and desired result fields. At step 306, the runtime component 150 enters a loop (comprising steps 306, 308, 310 and 312) for processing each query selection criteria statement present in the abstract query, thereby building a data selection portion of a Concrete Query. In one embodiment, a selection criterion consists of a field name (for a logical field), a comparison operator (=, >, <, etc) and a value expression (what is the field being compared to). At step 308, the runtime component 150 uses the field name from a selection criterion of the abstract query to look up the definition of the field in the data repository abstraction 148. As noted above, the field definition includes a definition of the access method used to access the physical data associated with the field. The runtime component 150 then builds (step 310) a Concrete Query Contribution for the logical field being processed. As defined herein, a Concrete Query Contribution is a portion of a concrete query that is used to perform data selection based on the current logical field. A concrete query is a query represented in languages like SQL and XML Query and is consistent with the data of a given physical data repository (e.g., a relational database or XML repository). Accordingly, the concrete query is used to locate and retrieve data from a physical data repository, represented by the databases 156-157 shown in FIG. 1. The Concrete Query Contribution generated for the current field is then added to a Concrete Query Statement. The method 300 then returns to step 306 to begin processing for the next field of the abstract query. Accordingly, the process entered at step 306 is iterated for each data selection field in the abstract query, thereby contributing additional content to the eventual query to be performed.

After building the data selection portion of the concrete query, the runtime component 150 identifies the information to be returned as a result of query execution. As described above, in one embodiment, the abstract query defines a list of abstract fields that are to be returned as a result of query execution, referred to herein as a result specification. A result specification in the abstract query may consist of a field name and sort criteria. Accordingly, the method 300 enters a loop at step 314 (defined by steps 314, 316, 318 and 320) to add result field definitions to the concrete query being generated. At step 316, the runtime component 150 looks up a result field name (from the result specification of the abstract query) in the data repository abstraction 148 and then retrieves a Result Field Definition from the data repository abstraction 148 to identify the physical location of data to be returned for the current logical result field. The runtime component 150 then builds (as step 318) a Concrete Query Contribution (of the concrete query that identifies physical location of data to be returned) for the logical result field. At step 320, Concrete Query Contribution is then added to the Concrete Query Statement. Once each of the result specifications in the abstract query has been processed, the query is executed at step 322.

Figure 4:
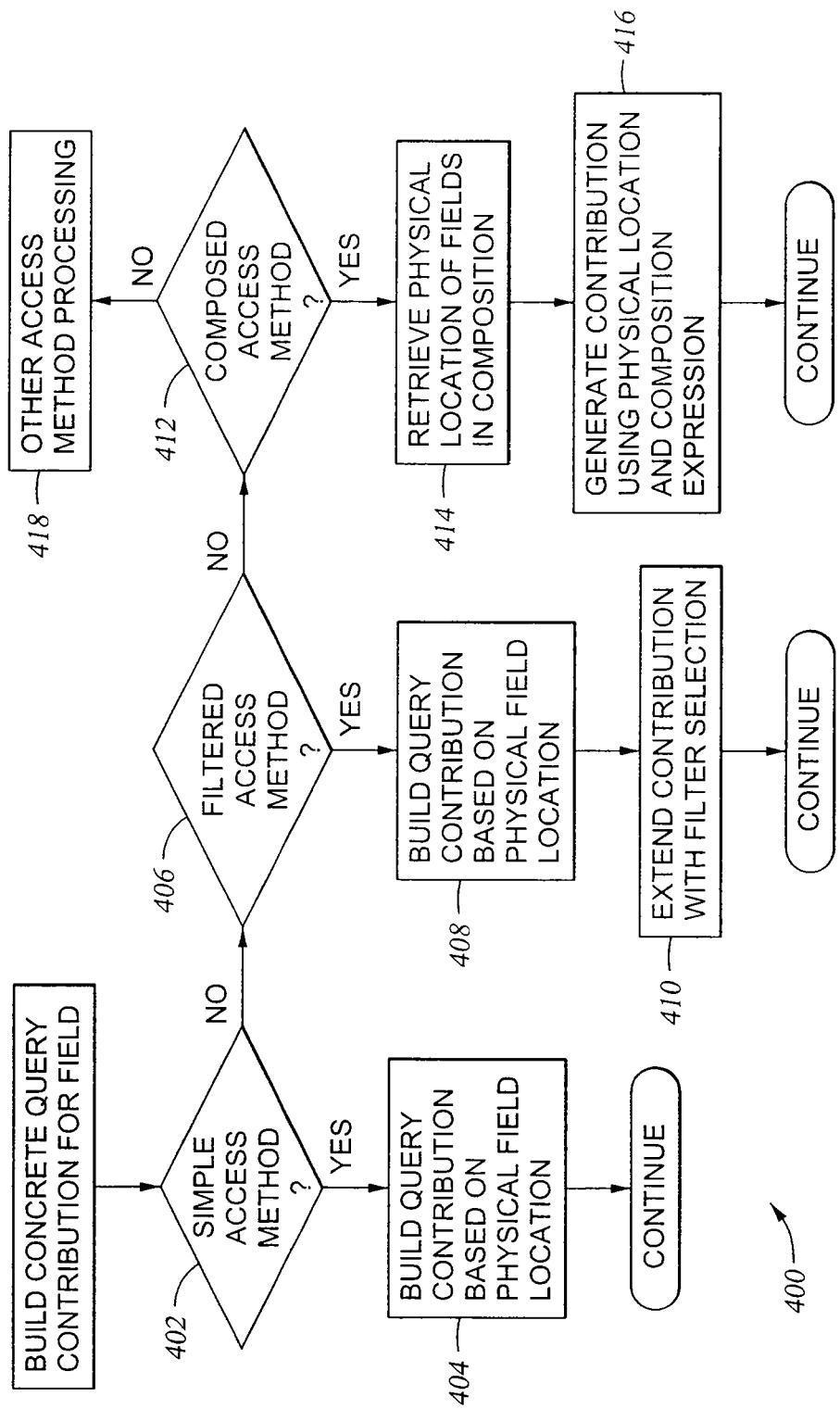
FIG. 4 is a flow chart illustrating the operation of a runtime component.

One embodiment of a method 400 for building a Concrete Query Contribution for a logical field according to steps 310 and 318 is described with reference to FIG. 4. At step 402, the method 400 queries whether the access method associated with the current logical field is a simple access method. If so, the Concrete Query Contribution is built (step 404) based on physical data location information and processing then continues according to method 300 described above. Otherwise, processing continues to step 406 to query whether the access method associated with the current logical field is a filtered access method. If so, the Concrete Query Contribution is built (step 408) based on physical data location information for some physical data entity. At step 410, the Concrete Query Contribution is extended with additional logic (filter selection) used to subset data associated with the physical data entity. Processing then continues according to method 300 described above.

If the access method is not a filtered access method, processing proceeds from step 406 to step 412 where the method 400 queries whether the access method is a composed access method. If the access method is a composed access method, the physical data location for each sub-field reference in the composed field expression is located and retrieved at step 414. At step 416, the physical field location information of the composed field expression is substituted for the logical field references of the composed field expression, whereby the Concrete Query Contribution is generated. Processing then continues according to method 300 described above.

If the access method is not a composed access method, processing proceeds from step 412 to step 418. Step 418 is representative of any other access methods types contemplated as embodiments of the present invention. However, it should be understood that embodiments are contemplated in which less then all the available access methods are implemented. For example, in a particular embodiment only simple access methods are used. In another embodiment, only simple access methods and filtered access methods are used.

As described above, it may be necessary to perform a data conversion if a logical field specifies a data format different from the underlying physical data. In one embodiment, an initial conversion is performed for each respective access method when building a Concrete Query Contribution for a logical field according to the method 400. For example, the conversion may be performed as part of, or immediately following, the steps 404, 408 and 416. A subsequent conversion from the format of the physical data to the format of the logical field is performed after the query is executed at step 322. Of course, if the format of the logical field definition is the same as the underlying physical data, no conversion is necessary.

Other Embodiments of Data Repository Abstraction Components

In one embodiment, a different single data repository abstraction component 148 is provided for each separate physical data representation 214. In an alternative embodiment, a single data repository abstraction component 148 contains field specifications (with associated access methods) for two or more physical data representations 214. In yet another embodiment, multiple data repository abstraction components 148 are provided, where each data repository abstraction component 148 exposes different portions of the same underlying physical data (which may comprise one or more physical data representations 214). In this manner, a single application 140 may be used simultaneously by multiple users to access the same underlying data where the particular portions of the underlying data exposed to the application are determined by the respective data repository abstraction component 148. This latter embodiment is described in more detail in U.S. Pat. No. 6,928,431, issued on Aug. 9, 2005, entitled "DYNAMIC END USER SPECIFIC CUSTOMIZATION OF AN APPLICATION'S PHYSICAL DATA LAYER THROUGH A DATA REPOSITORY ABSTRACTION LAYER" and assigned to International Business Machines, Inc., which is hereby incorporated by reference in its entirety.

In any case, a data repository abstraction component 148 contains (or refers to) at least one access method which maps a logical field to physical data. To this end, as illustrated in the foregoing embodiments, the access methods describe a means to locate and manipulate the physical representation of data that corresponds to a logical field. In one embodiment, the access methods are further configured with a location specification defining a location of the data associated with the logical field. In this way, the data repository abstraction component 148 is extended to include description of a multiplicity of data sources that can be local and/or distributed across a network environment. The data sources can be using a multitude of different data representations and data access techniques. In this manner, an infrastructure is provided which is capable of capitalizing on the distributed environments prevalent today. One approach for accessing a multiplicity of data sources is described in more detail in U.S. Pat. No. 6,954,748, issued Oct. 11, 2005, entitled "REMOTE DATA ACCESS AND INTEGRATION OF DISTRIBUTED DATA SOURCES THROUGH DATA SCHEMA AND QUERY ABSTRACTION" and assigned to International Business Machines, Inc.

In various embodiments, numerous advantages over the prior art are provided. In one aspect, advantages are achieved by defining a loose coupling between the application query specification and the underlying data representation. Rather than encoding an application with specific table, column and relationship information, as is the case where SQL is used, the application defines data query requirements in a more abstract fashion that are then bound to a particular physical data representation at runtime. The loose query-data coupling of the present invention enables requesting entities (e.g., applications) to function even if the underlying data representation is modified or if the requesting entity is to be used with a completely new physical data representation than that used when the requesting entity was developed. In the case with a given physical data representation is modified or restructured, the corresponding data repository abstraction is updated to reflect changes made to the underlying physical data model. The same set of logical fields are available for use by queries, and have merely been bound to different entities or locations in physical data model. As a result, requesting entities written to the abstract query interface continue to function unchanged, even though the corresponding physical data model has undergone significant change. In the event a requesting entity is to be used with a completely new physical data representation different than that used when the requesting entity was developed, the new physical data model may be implemented using the same technology (e.g., relational database) but following a different strategy for naming and organizing information (e.g., a different schema). The new schema will contain information that may be mapped to the set of logical fields required by the application using simple, filtered and composed field access method techniques. Alternatively, the new physical representation may use an alternate technology for representing similar information (e.g., use of an XML based data repository versus a relational database system). In either case, existing requesting entities written to use the abstract query interface can easily migrate to use the new physical data representation with the provision of an alternate data repository abstraction which maps fields referenced in the query with the location and physical representation in the new physical data model.

In another aspect, the ease-of-use for the application builder and the end-user is facilitated. Use of an abstraction layer to represent logical fields in an underlying data repository enables an application developer to focus on key application data requirements without concern for the details of the underlying data representation. As a result, higher productivity and reduced error rates are achieved during application development. With regard to the end user, the data repository abstraction provides a data filtering mechanism, exposing pertinent data and hiding nonessential content that is not needed by a particular class end-user developing the given query.

Solutions implementing the present model use the provided abstract query specification to describe its information requirements, without regard for the location or representation of the data involved. Queries are submitted to the runtime component which uses the data repository abstraction component to determine the location and method used to access each logical piece of information represented in the query. In one embodiment, the runtime component also includes the aforementioned data caching function to access the data cache.

In one aspect, this model allows solutions to be developed independent of the physical location or representation of the data used by the solution, making it possible to easily deploy the solution to a number of different data topologies and allowing the solution to function in cases where data is relocated or reorganized over time. In another aspect, this approach also simplifies the task of extending a solution to take advantage of additional information. Extensions are made at the abstract query level and do not require addition of software that is unique for the location or representation of the new data being accessed. This method provides a common data access method for software applications that is independent of the particular method used to access data and of the location of each item of data that is referenced. The physical data accessed via an abstract query may be represented relationally (in an existing relational database system), hierarchically (as XML) or in some other physical data representation model. A multitude of data access methods are also supported, including those based on existing data query methods such as SQL and XQuery and methods involving programmatic access to information such as retrieval of data through a Web Service invocation (e.g., using SOAP) or HTTP request.

Modification Operations

Aspects of the invention are described above with reference to accessing data for the purpose of returning results. In the case of SQL, these are SELECTION operations. However, modification operations are contemplated, including well-known modification operations such as UPDATE, INSERT, DELETE and the like. Accordingly, the following describes embodiments extending and enhancing the functionality of the abstract framework described above to support modification operations.

In one embodiment, a set of "focus items" (also referred to herein as "seed fields") for an abstract modification operation is used to support multiple physical operations that span multiple entities in the physical data repository. Using relational databases as an example, this allows for performing an abstract insert operation that performs inserts into multiple physical database tables.

Based on the focus items, multiple physical operations are performed against the data repository to implement a single abstract operation. For inserting into a relational database, for example, this would involve creation of multiple physical SQL INSERT statements for the tables involved. As name/value pairs are specified for insertion or update in the data repository, they are applied to the appropriate physical database operations involved. Updates and deletes allow for conditions to be specified that can be used to target the changes required in the physical data repository. Since a single abstract operation can result in multiple physical operations, transactional support required to ensure that an operation is completed or rolled back as a single unit of work is also abstracted. In other words, a transaction is scoped to the abstraction operation and includes all of the physical operations it is mapped to. This allows for the abstraction operation to be committed in its entirety or to be rolled back should one of the individual physical operations fail.

The implementation for using focus items to define the set of physical entities involved can either be static or relatively dynamic. In a static implementation, a set of focus items is determined up front and the related database operations are well known to a runtime component at the beginning of an abstract operation. In a more dynamic implementation, the set of focus items is determined as name/value pairs for the modification operation are input. That is, as additional fields to modify are added, the set of required, optional, and defaulted values changes based on the additional set of entities (e.g. database tables) involved. For example, consider a patient database where the basic contact information (name, address, phone, etc) is maintained separate from the patient's insurance information. Assume the application wants to insert a new patient including information about their insurance provider. First, the application indicates that it wants to insert a patient name. Based on adding the patient name as a focus item, the runtime component indicates that other patient contact information is also required to complete the insert into the demographics table. Next, the application adds the name of the insurance carrier as a focus item and the runtime component now understands (based on the abstract data representation) that two different tables are involved in the insert operation. The runtime component understands that an entry for the insurance table was also desired and, therefore, indicates any additional required or optional fields within that table.

Accordingly, the runtime component can guide the application in obtaining the input for the abstract operation based on the abstract data representation and the focus items. First, the runtime component can provide back the set of fields that are required or optional for completing the operation. This helps decouple the application from the detailed knowledge of the underlying database schema. In addition, the runtime component can also provide the user with details about how to gather the input values. One mechanism is to provide an HTML form that can be used to request the details for a modification operation. For example, if a new patient is being added, the focus item may likely be a new patient name. From this, the implementation can indicate that values are required for name, address, phone number and optional values for something like email address. Based on the definition of the abstract data representation, the implementation could also provide back an HTML form that would gather that information. It can use abstract representations for values within the HTML form for more readable values and provide appropriate constraints for the data based on the underlying requirements. For example, a drop down list of state names can be included in the form that map to the underlying two character state codes used in the underlying physical database. This would constrain the available values to an appropriate list of states as well as providing meaningful names to the user.

Figure 5:
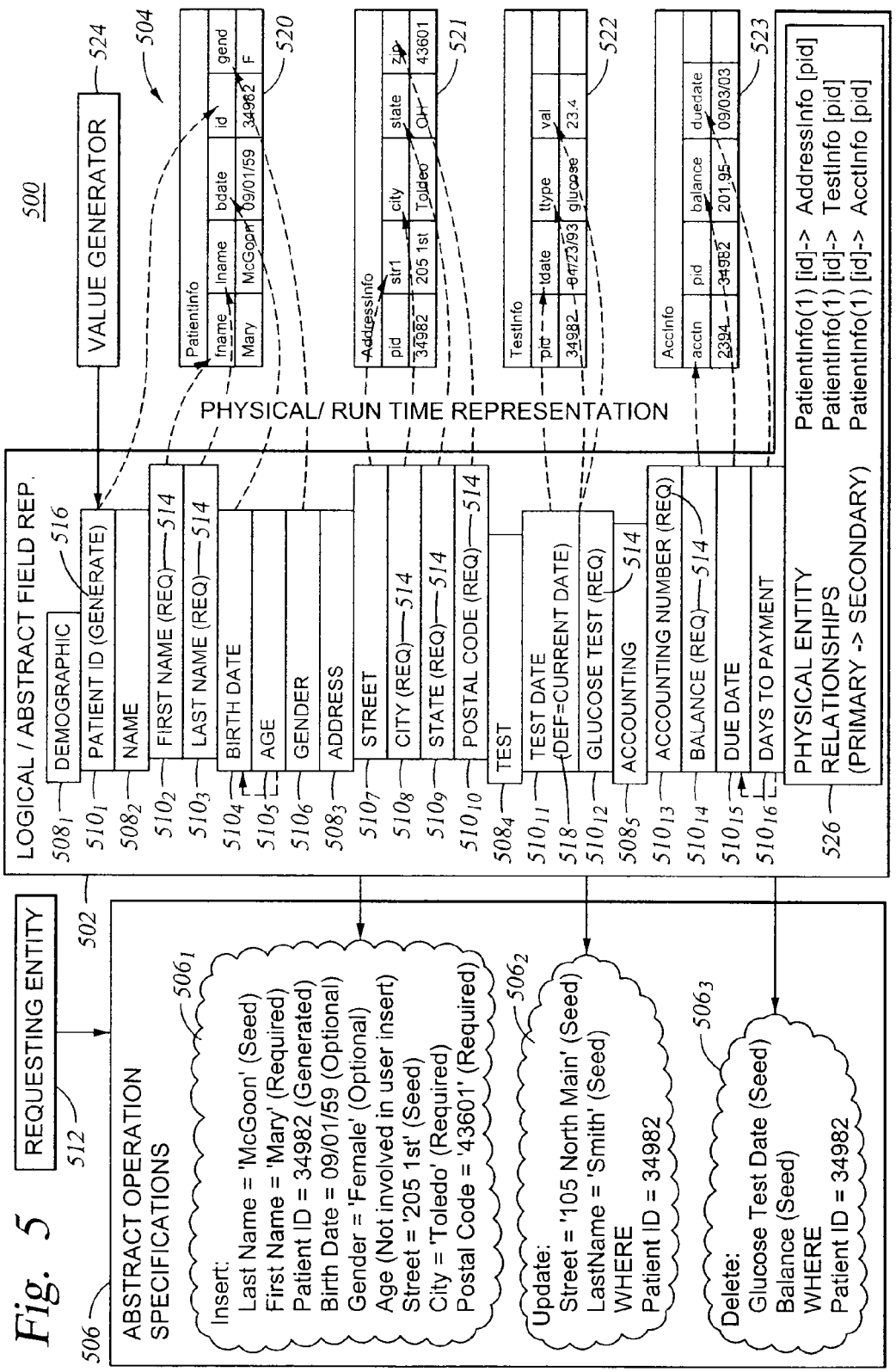
FIG. 5 is a relational view of software components of one embodiment of the invention configured to process modification operations against a physical data source through an abstract representation of the physical data source.

Referring now to FIG. 5, an environment 500 includes a representative data repository abstraction component (DRA) 502 (representing a particular instance of the data repository abstraction component 148 described above) configured to support modification operations against a physical data source. By way of illustration only, the physical data source being modified via the data repository abstraction component 502 is a relational data source 504 containing a plurality of tables 520-523. However, as described above, abstract representation of any data type is contemplated.

The relational data source 504 may be indirectly modified by abstract insert operations, update operations, and delete operations (collectively, abstract modification operations or simply abstract operations). The abstract modification operations describe updates to the physical data source that are made via physical operations generated from abstract specifications. Thus, each of the abstract modification operations is implemented according to a respective abstract operation specification, i.e., an abstract insert operation specification $506_1$, an update operation specification $506_2$ and a delete operation specification $506_3$ (collectively, abstract operation specifications 506). The abstract operation specifications 506 are composed via the data repository abstraction component 502 according to specifications provided by a requesting entity 512 (e.g., a user/application). Illustratively, the requesting entity 512 is the application 140 (shown in FIG. 1) which is accessed by a user via a user interface, such as the browser 122 (also shown in FIG. 1).

In general, modification of the data source 504 requires determining the physical entities of the data source 504 being modified. Having determined the physical entities, additional logical fields, representing additional physical fields within the same physical entities to be modified, can be specified. The framework of the present application will "guide" the requesting entity 512 through the related fields rather than requiring that knowledge about a database schema at the application level. From the end-user's perspective, this process may be implemented by the provision of HTML forms 160 (shown in FIG. 1) which may be populated with identifiers indicating the nature of a particular field (e.g., whether a value for the field is necessary or optional).

In some embodiments, a focus field is used to advantage in constructing abstract operation specifications 506, thereby ensuring that the correct operations are performed against the underlying database. For example, a focus field referred to herein as a "seed" is used to advantage in constructing an abstract insert specification $506_1$ abstract update specification $506_2$, and an abstract delete specification $506_3$. The seed is used to identify the physical entities being modified and when it is necessary to identify each of the related logical fields defining a particular entity represented in the physical data. Consider, for example, the entity of "patient". In a relational database the patient entity may be a patient information ("patientinfo") table 520 having five columns. The columns may include, for example, an "fname" column (corresponding to an individual's first name), "lname" column, (corresponding to an individual's last name) "bdate" column, (corresponding to an individual's birth date) "id" (corresponding to a patient identifier) and "gend" column (corresponding to gender). From a logical/abstract perspective, the patient entity may be defined by the "Patient ID" logical field specification $510_1$, the "First Name" logical field specification $510_2$ and the "Last Name" logical field specification $510_3$. In this case, the "Last Name" logical field may be a seed field, as is illustratively represented by the abstract insert specification $506_1$ of FIG. 5. In the present invention, a single abstract operation is implemented by multiple operations against the physical data 504 and spans multiple physical entities (i.e., tables in the case of a relational database). Accordingly, the illustrative abstract insert specification $506_1$ includes another seed field, "State", for an address entity represented by the "AddressInfo" table 521. As such, the illustrative abstract insert specification $506_1$ affects two tables, the "patientinfo" table 520 and the "AddressInfo" table 521. Examples of seed fields for the abstract update specification $506_2$ and the abstract delete specification $506_3$. The seed fields for the abstract update specification $506_2$ of FIG. 5 includes the logical field "Street" and "Last Name". The exemplary abstract delete specification $506_3$ of FIG. 5 illustrates a delete operation in which the logical field "Glucose Test" and "Balance" are seed fields. Although in the present examples, each abstract operation includes two seed fields, an abstract operation may also be implemented with any number of seed fields, including only a single seed field. For example, the seed field may be a primary key having an associated foreign key. In cases where the DBMS is configured for automatic propagation, an abstract operation specifying the seed field may affect the physical data on which the foreign key is defined. It should be noted that in some cases this result may not be desirable. That is, it may be undesirable to propagate changes based on primary key/foreign key relationships. If propagation is desired, only one statement directed to modifying the table containing the primary key is needed. The DBMS will handle modifications to the related tables. In some instances the DBMS may not support propagation, in which case multiple statements are needed. Although not shown the data repository abstraction component may include an attribute specifying whether propagation is desired or not for a given logical field.

In one embodiment, the seed fields are determined by the requesting entity 512. That is, the first fields selected by the requesting entity for a particular operation are designated as the seed field. The seed fields are used to determine the physical entities to modify. In the case of the exemplary abstract insert specification $506_1$ the seed fields are also required fields (as specified by the data repository abstraction component 502) and are used to identify related logical fields (which in turn map to physical fields) needed to successfully implement the modification operation. In the case of insert operations, the related fields are those which will actually be modified.

Each operation will include at least two logical fields for which values may be specified (but need not be in every case), either as part of the physical entity identification criteria or as selection criteria. Generally, fields may be required or optional. "Required" means that the requesting entity must supply a value for the field because there is no suitable default value, no algorithm to generate a value and the field cannot be null. An optional field is one which does not require specification of a value by the requesting entity. Optional fields include: 1) fields that can be assigned the value of NULL; 2) fields that have an algorithm that can be used to generate a value for that field (referred to herein as "generated fields"); and 3) fields that have a defined default value in the DRA (referred to herein as "default fields"). Generated field values are generated by a value generator 524 (i.e., an algorithm). Default values are used where no name/value pair was specified for a particular field related to the entity defined by a seed field. Default values may be statically defined or generated. As an example of a generated default value, the Test Date value in the illustrative abstract delete specification $506_3$ defaults to the current date. The requesting entity (e.g., user) may be given the option of supplying a different value.

As an example of required and optional fields, consider the logical fields corresponding to the patient entity. It was noted above that the patient entity is logically defined by the "Patient ID" logical field specification $510_1$, the "First Name" logical field specification $510_2$ and the "Last Name" logical field specification $510_3$. The "First Name" logical field specification $510_2$ and the "Last Name" logical field specification $510_3$ include the required attribute and are required fields. In contrast, the other logical fields defining the patient entity (i.e., birth date and gender) are optional.

By way of example, consider the case of inserts and updates to the data source 504 which provide for identification of the actual fields (i.e. columns) that are to be modified along with the new value to be put in the data source. Accordingly, a set of name/value pairs represents the fields/values within the data repository abstraction component 502 that correspond to the physical fields/values to be modified. The name represents the abstract name for the logical field that is mapped via the data repository abstraction component 502 to its underlying physical representation. The value is the actual value to be inserted or updated in the data source for that field. In one aspect, using an abstract data model (i.e., the data repository abstraction component 502) allows for automatic conversion of abstract values (also referred to herein as "internal" values) to the correct physical values to be inserted into the database. For example, the data repository abstraction component 502 can be defined to use values such as "Male" and "Female" for gender when the underlying physical data repository may use values of "F" and "M" to represent those values, as illustrated by the patient information table 520, which contains a record having the value "F" in the gender (gend) column. Input values for an insert or update operation take advantage of those abstract value specifications to provide further cushion for changes to the underlying physical representation of not only the structure of the underlying data repository, but also from the physical form of the data contained within the data repository.

In many cases, an abstract field may be physically represented in multiple fields in a physical data repository. One example would be the case in the relational data source 504 where a column in one table was defined as a foreign key to a column in another database table. For example, a patient ID may be a primary key within the patient information table 520 and may also be defined as a foreign key within the test information table 522. Although this is a typical example, an abstract relationship between two fields does not necessarily have to be enforced by a physical relationship (such as primary/foreign key) in the underlying data repository. Using metadata about the relationship between the two physical locations (i.e., relationship between column(s) in a first table to column(s) in a second table), a single field within the abstract data representation can be used to handle both physical locations for the field. The application is shielded from the knowledge of the various places a particular value is used within the database schema.

Special considerations must be taken into account when these related fields are included on an insert, update, or delete operation. When performing an insert operation, the runtime/DRA logic must recognize the various physical representations for the single abstract data field. The correct physical representation must be used based on the focus item of the insert operation. For example, if the patient identifier was represented as column "ID" in the patient information table 520 and as column "PID" in the test information table 522, the correct column name must be identified based on the table defined for the insert operation by the focus item. Additionally, these additional forms of the physical representation must be taken into account when determining default values and required values for the insert operation. For example, if the focus item identified that the underlying physical table for the operation was the test information table 522, the runtime/DRA logic must recognize that the abstract patient ID field ("PID") must be considered when looking for default and required values. That is, a new patient ID cannot be generated.

Additional considerations must be given to update and delete operations when dealing with abstract fields that represent multiple locations in the physical data repository to ensure that data integrity is maintained. The underlying data repository may enforce additional restrictions on these types of fields. Relational databases provide aspects such as restricting updates or deletes to columns defined with a primary key/foreign key relationship or cascading those updates and deletes through the foreign key tables. That is, a delete against a primary table such as the patient information table 520 could be set up to indicate that the delete should cascade and delete the corresponding rows from the test information table 522 based on the primary key/foreign key relationship based on patient ID. Using an abstract representation of the data repository, the implementation can choose whether to restrict these operations or attempt to propagate the changes through the various physical entities based on the definition of the relationships for the abstract field.

In order to implement the above-described features and aspects, the data repository abstraction component 502 is configured with a plurality of attributes, which are now described.

Initially, it is noted that the details described above with respect to the data repository abstraction component 148 in FIG. 2B are applicable to the abstraction component 502 shown in FIG. 5, but have not been shown for convenience and simplicity, and to facilitate emphasis of additional attributes. In other cases, representation of attributes has been simplified. For example, reference to logical fields used in defining composed fields is represented by arrows, such as in the case of the "Age" logical field specification $510_5$ and the "Days to Payment" logical field specification $510_{16}$. The abstraction component 502 defines a plurality of categories including Demographic $508_1$, Name $508_2$, Address $508_3$, Test $508_4$ and Accounting $508_5$ (collectively, categories 508). Each of the categories 508 relates two or more logical fields $510_{1-16}$, but it is contemplated that a category may also be defined for a single logical field. Selected logical fields are configured with attributes used in composing abstract operation specifications 506. Such attributes include a "Required" attribute, a "Generate" attribute and a "Default Value" attribute. For example, the "First Name" logical field specification $510_2$, the "Last Name" logical field specification $510_3$, the "City" logical field specification $510_8$, the "State" logical field specification $510_9$, the "Postal Code" logical field specification $510_{10}$, the "Glucose Test" logical field specification $510_{12}$, the "Account Number" logical field specification $510_{13}$ and the "Balance" logical field specification $510_{14}$ are configured with the "Required" attribute 514. The "Patient ID" logical field specification $510_1$ is configured with the "Generate" attribute 516 and the Test Date logical field specification $510_{11}$ is configured with the "Default Value" attribute 518, where the default value is specified as "Current_Date".

Preferably, one data repository abstraction component 502 is provided for all modifications (i.e., insert, update and delete). However, it is contemplated that a separate data repository abstraction component may be provided for each abstract modification operation.

Embodiments of the present invention are directed to supporting multiple operations against physical data based on a single abstract modification operation. As such, a mechanism is needed to ensure the proper order in which the multiple operations (against the physical data) are carried out. In one embodiment, the statements implementing the multiple operations are ordered according to a physical entity relationships specification 526, which is part of the data repository abstraction component 502. The physical entity relationships specification 526 defines the interrelationships between entities in a physical model (i.e., the relational database 520). By way of illustration, the physical entity relationships specification 526 shown in FIG. 5 relate the patient information table 520 to each of the other tables 521-523 in the data source 504. In each case, the patient information table 520 is primary with respect to a secondary table. Although not illustrated in the physical entity relationships specification 526 of FIG. 5, it is contemplated that additional levels of hierarchy may be defined. For example, the address information table 521 may be defined as a primary entity with respect to some other secondary table (referred to for convenience as "Table A") not shown in FIG. 5. In this case, a three-tiered hierarchy is defined in which the patient information table 520 is the primary entity, the address information table 521 is the secondary entity, and Table A is the tertiary entity. In such an arrangement, the patient information table 520 and the address information table 521, and the address information table 521 and Table A are explicitly in a primary-secondary relationship, and by syllogism, the patient information table 520 and Table A are in a primary-secondary relationship.

The physical entity relationships specification 526 also indicates the basis for a primary-secondary relationship between entities. Specifically, the field (i.e., column) on which the relationship is based is specified. In the present illustration, the entity relationships are defined for the patient identifier ("ID" and "PID", respectively). Although only one field name is shown specified for each entity, two or more may be specified such that each entity is related by two or more pairs of fields. Consider the following example of a relationship: Entity 1 [field 1, field 3, field 6]→Entity 2 [field 2, field 3, field 4]. In this example, the fields 1, 3 and 6 of the primary entity, Entity 1, are related to fields 2, 3 and 4, respectively, of the secondary entity, Entity 2.

Referring now to FIG. 6, a method 600 illustrates the interaction between requesting entity 512 and the data repository abstraction component 502 in the case of composing an abstract insert specification. For purposes of illustration it will be assumed that the requesting entity 512 is representative of the application 140 (FIG. 1), which receives input from a user via a user interface (e.g. the browser program 122 FIG. 1). Initially, the user specifies seed fields. For each seed field specified (step 602), the requesting entity 512 issues a request to add the seed field to the abstract insert specification 506, (step 604), which results in the abstract insert specification 506, being updated with the seed field (step 608). Once each of the seed fields has been specified (or iteratively after each seed field is specified), the requesting entity 512 issues a request for the required and optional fields according to the specified seed fields (606). The data repository abstraction component 502 is invoked to determine required and optional fields for the insert operation (step 610). An illustrative representation of the processing occurring at step 610 is described below with reference to FIG. 7. Having made the determination at step 610, an abstract insert specification 506, is initialized with the required and optional fields (step 612). The required and optional fields are then returned to the requesting entity (step 614), which prompts the user to provide values for each of the fields (step 616). Well-known techniques in the art of user interfaces may be used to identify and distinguish for the user required fields and optional fields. For example, required fields may be highlighted in red, marked with an asterisk, or include a parenthetical comment indicating that the field is required. In an alternative embodiment, the application 140 itself may provide all or some of the values. Once values for at least each of the required fields (and any optional fields) has been specified (step 618), the abstract insert specification 506, is populated with the specified values (step 620).

Figure 7B:
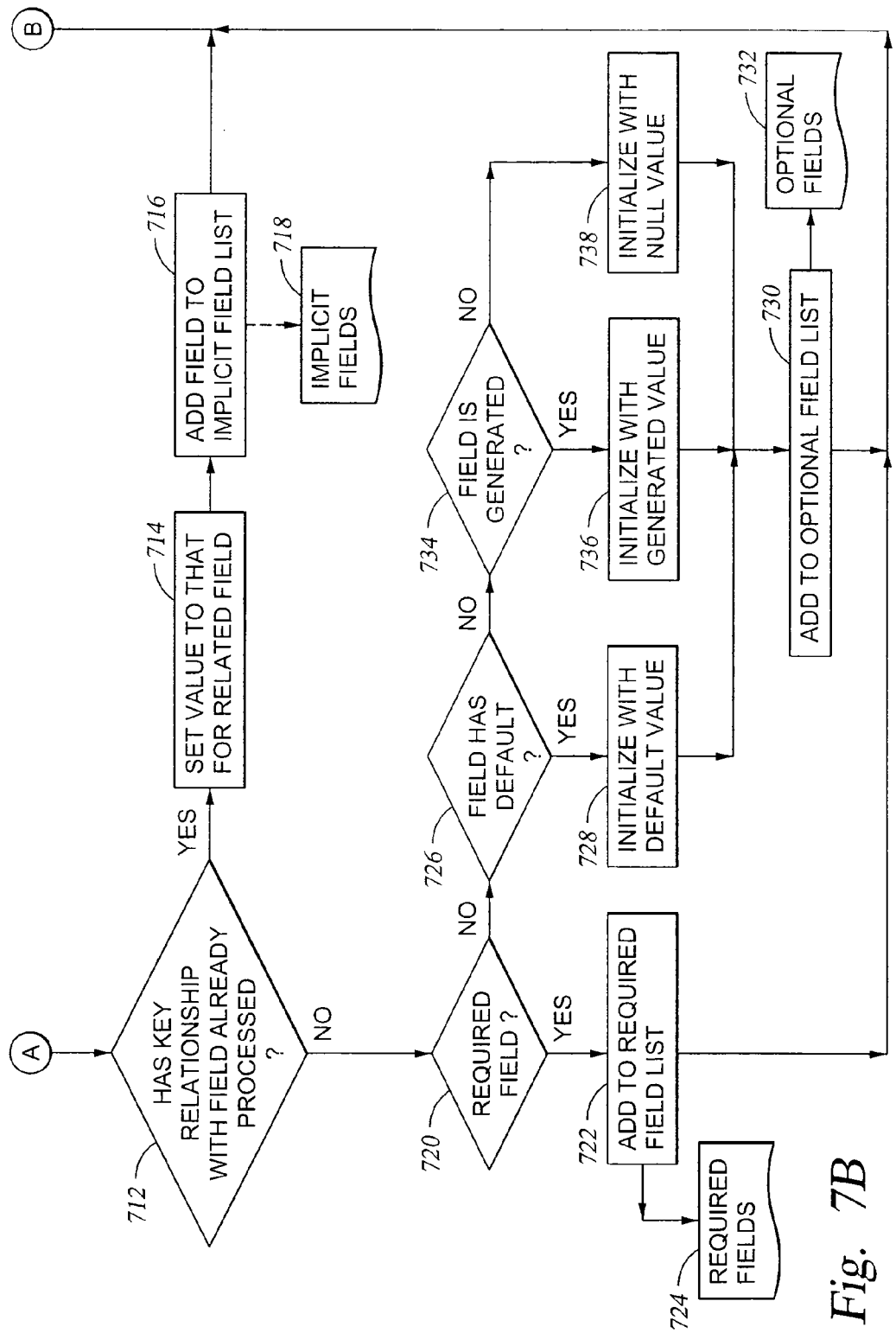
FIG. 7 is a flow chart illustrating the determination of required and optional fields in an insert operation.

Referring now to FIG. 7, one embodiment of step 610 for determining required and optional fields is shown. After accessing the abstract insert specification 506, to retrieve the seed fields (step 702) specified by the requesting entity 512, the appropriate logical field specification of the data repository abstraction component 502 is referred to in order to determine the physical entities (e.g., tables in the relational data source 504 shown in FIG. 5) corresponding to the seed fields (step 704). In the case of an insert operation, for each identified physical entity, the data repository abstraction is used to determine other logical fields associated with the same physical entity (steps 706 and 708). A loop is then entered (at step 710) for each of the determined related logical fields that define a particular physical entity referenced by a seed field. That is, a series of steps is performed for each of the related logical fields of each physical entity. For a given logical field of a given physical entity, a determination is made as to whether a key relationship for the given logical field has already been processed (step 712). For the first iteration of the loop entered at step 706 the determination made at step 712 is answered in the negative. During subsequent iterations, step 712 ensures that once a value has been specified for a field, a subsequent and conflicting value will not be specified. Processing is then performed to determine whether the field is a required field (at step 720), whether the field is a default value field (step 726), or whether the field is a generated value field (step 734). The field type is determined according to the attribute (i.e., the required attribute 514, the generate attribute 516 or the default attribute 518) present in the logical field specification for the current field being processed by the loop. If the field is required (step 720), the field is added (step 722) to a required field list 724. In the case of a default attribute (step 726), the field value is initialized with a default value (step 728). Where the logical field specification includes a generate attribute 518 (step 734), the field is initialized with a generated value (step 736). In the case of both generated values and default values, the corresponding fields are added (step 730) to an optional fields list 732. If the field is not defined as any one of required, default or generated, then the field is initialized with a NULL value (step 738) and then added (step 730) to the optional field list 732.

Returning to step 712, if the current field being processed is in a key relationship (e.g., primary key/foreign key relationship) with another field which has already been processed, then the value for the current field is set to the value of the previously processed related field (step 714). The current field is then added to an implicit field list 718 (step 716). Accordingly, implicit fields are created with multiple physical entities are involved in the abstract operation and those entities have key relationships. In this case, only one field and one value is exposed through the interface. The other field in the pair of key fields is considered implicit; it does not have to be specified as part of the abstract insert and will take on the same value as the corresponding key in the pair. The implicit fields are not exposed to the requesting entity, but are accounted for when the abstract insert is converted into a concrete (i.e., executable) insert statement, as will be described below with reference to FIG. 8.

Once each identified related field is processed according to the loop entered at step 710, the processing is repeated for the next entity (step 706). Once each entity has been processed, the processing to determine required and optional fields is complete. Accordingly, the abstract insert specification 506₁ is updated according to the required fields list 714 and optional fields list 722 (step 612), and the required fields and optional fields are then provided to the requesting entity 512 (step 614), as shown in FIG. 6.

Figure 8:
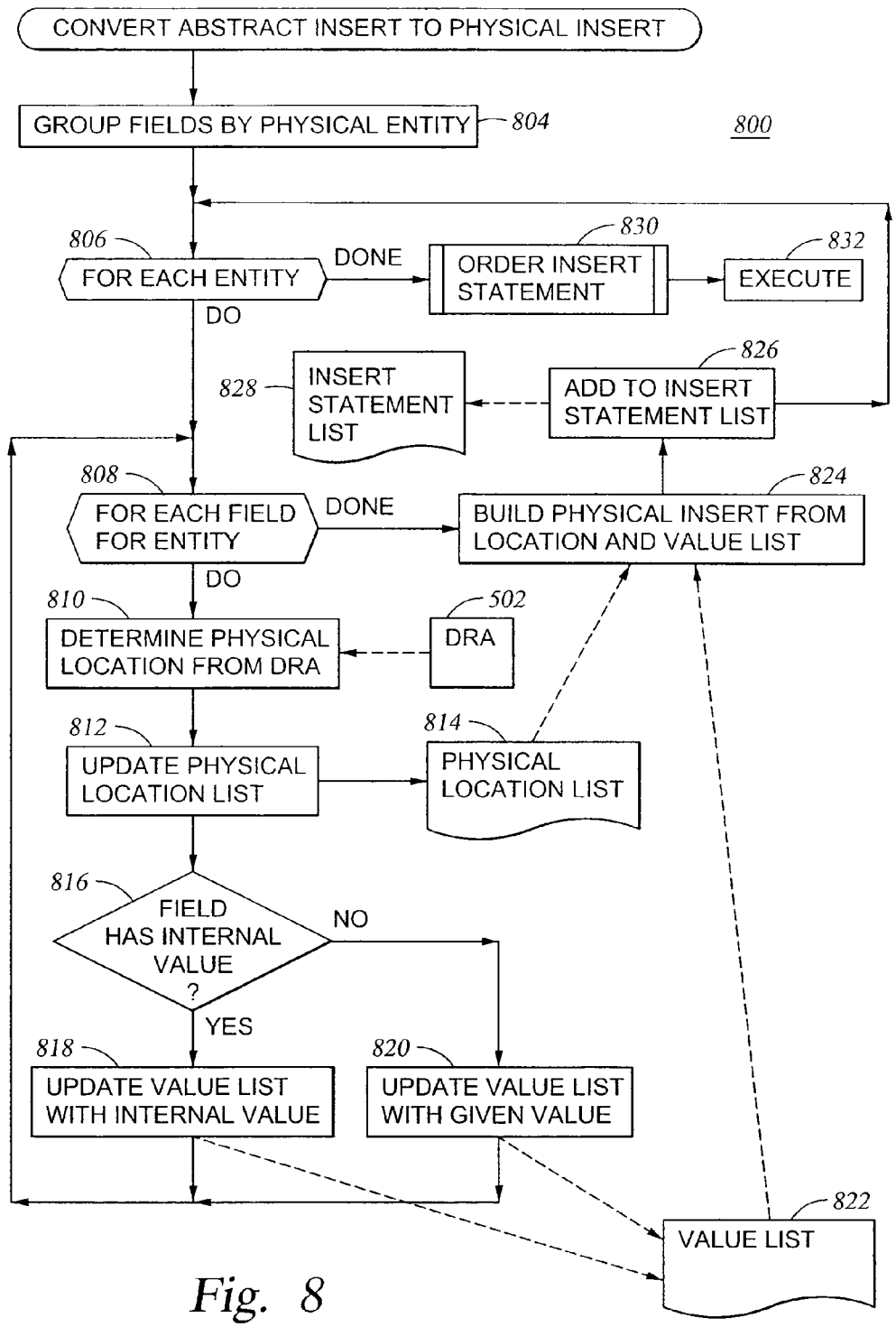
FIG. 8 is a flow chart illustrating the conversion of an abstract insert operation to a physical insert operation.

Having composed the abstract insert specification 506₁, the insert operation may be executed. FIG. 8 shows one embodiment of a method 800 for executing the insert operation according to the abstract insert specification 506₁. Generally, upon submission of a request to execute the insert from the requesting entity 512, the run-time component 150 (described above with reference to FIG. 1) is invoked convert the abstract insert specification 506₁ to a physical insert operation. The physical insert operation is then executed.

Conversion of the abstract insert specification 506₁ to a physical insert operation is initiated by grouping fields (from the implicit field list 718, the required field list 724, and the optional field list 732) according to their respective physical entities (804). In particular, the run-time component 150 then enters a loop (step 806) for each physical entity and a sub-loop (step 808) for each logical field of a given physical entity. For a given logical field, the physical location of the field is determined from the data repository abstraction component 502 (step 810). A physical location list 814 is then updated with the determined physical location (step 812). In some cases, the logical field may have an internal value (determined at step 816). That is, the value of the logical field may be different from the value for the physical field. For example, the logical field name may be "Male" while the physical field name is "M". In this case, the value must be made consistent with physical value. This is done by updating a value list 822 with the internal value (step 818). If the field values are not different (i.e., step 816 is answered negatively), the value list 822 is updated with the given value for the physical field (step 820).

Once the processing for the loop entered at step 808 has been performed for each logical field in the abstract insert specification 5061, for a given physical entity, a physical insert statement is built from the location list 814 and the value list 822 (step 824). The physical insert statement is then added to an insert statement list 822 (step 826). The foregoing processing is then repeated successively for each entity (step 806). Subsequently, an ordering algorithm is performed on the insert statement list 828 (step 830). One embodiment of the ordering algorithms is described with reference to FIG. 9. The physical insert operation is then executed (step 832).

Figure 9:
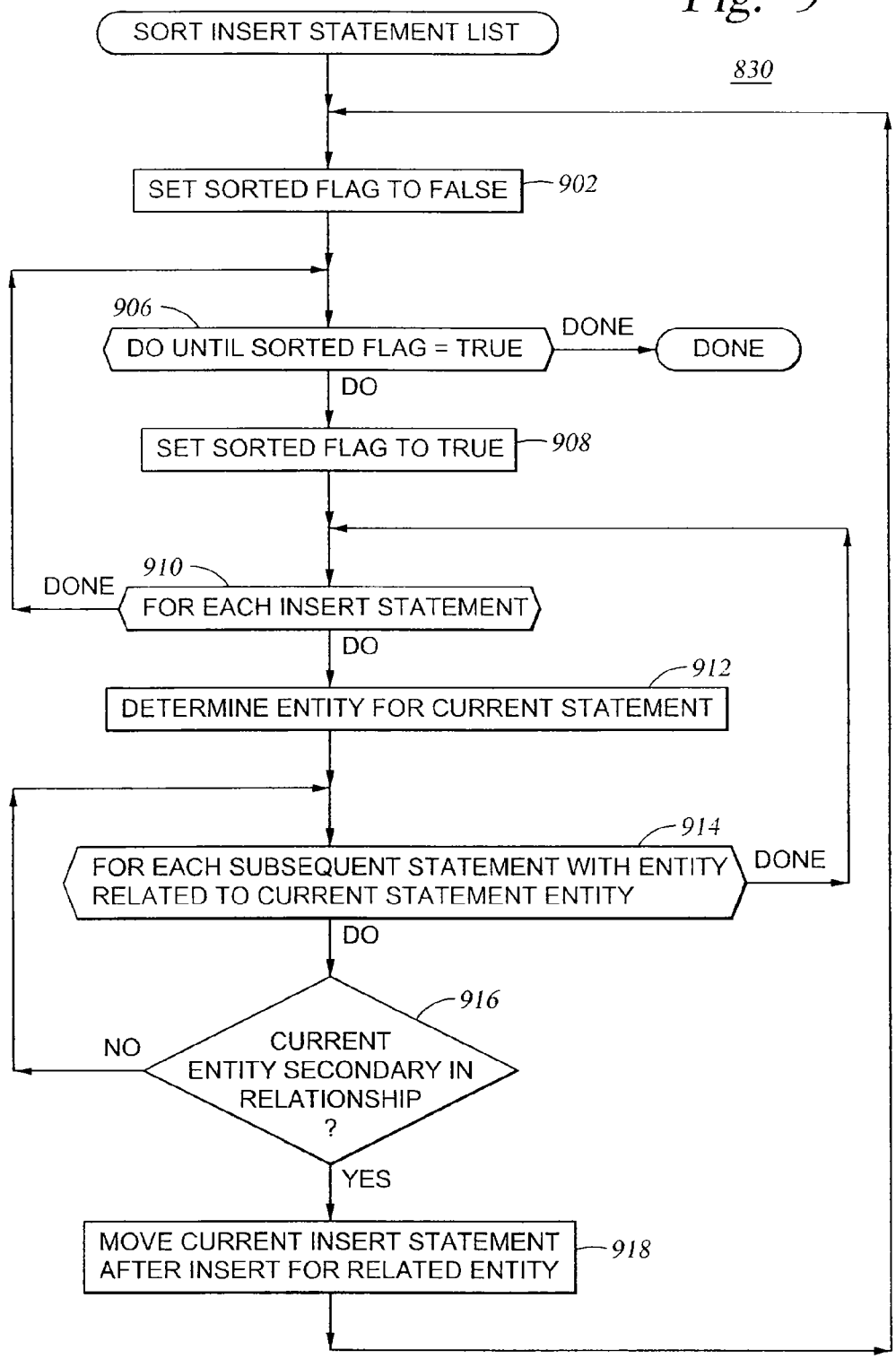
FIG. 9 is a flow chart illustrating sorting of an insert statement list to ensure a proper order of execution.

Referring now to FIG. 9, an embodiment of the ordering algorithm performed at step 830 is described. Initially, a "sorted flag" is set to False (step 902). A series of steps are then performed for each insert statement in the insert statement list 828 until the "sorted flag" is set to True (steps 906, 908 and 910). Specifically, for a given insert statement in the insert statement list 828 (beginning with the first insert statement in the list), the corresponding entity is determined (step 912). Then, the relationship between the corresponding entity of the given insert statement and each related entity of the remaining insert statements in the insert statement list 828 is determined (step 914 and 916). Specifically, the run-time component 150 determines (with respect to the physical entity relationships specification 526) whether the entity of the given insert statement is a secondary entity with respect to a primary related entity of another insert statement (step 916). If so, the given insert statement is moved to a position after the insert statement of the related entity (step 918). This process is repeated until the insert statement list 828 can be traversed without encountering a current entity which is secondary with respect to an entity of a subsequent statement in the insert statement list 828. At this point, the physical insert statements in the insert statement list 828 are ordered according to the hierarchical relationship specified in the physical entity relationships specification 526. This process ensures that a primary entity containing a primary key of a primary/foreign key pair is inserted into first, before the secondary entity (containing the foreign key) is modified.

Figure 17:
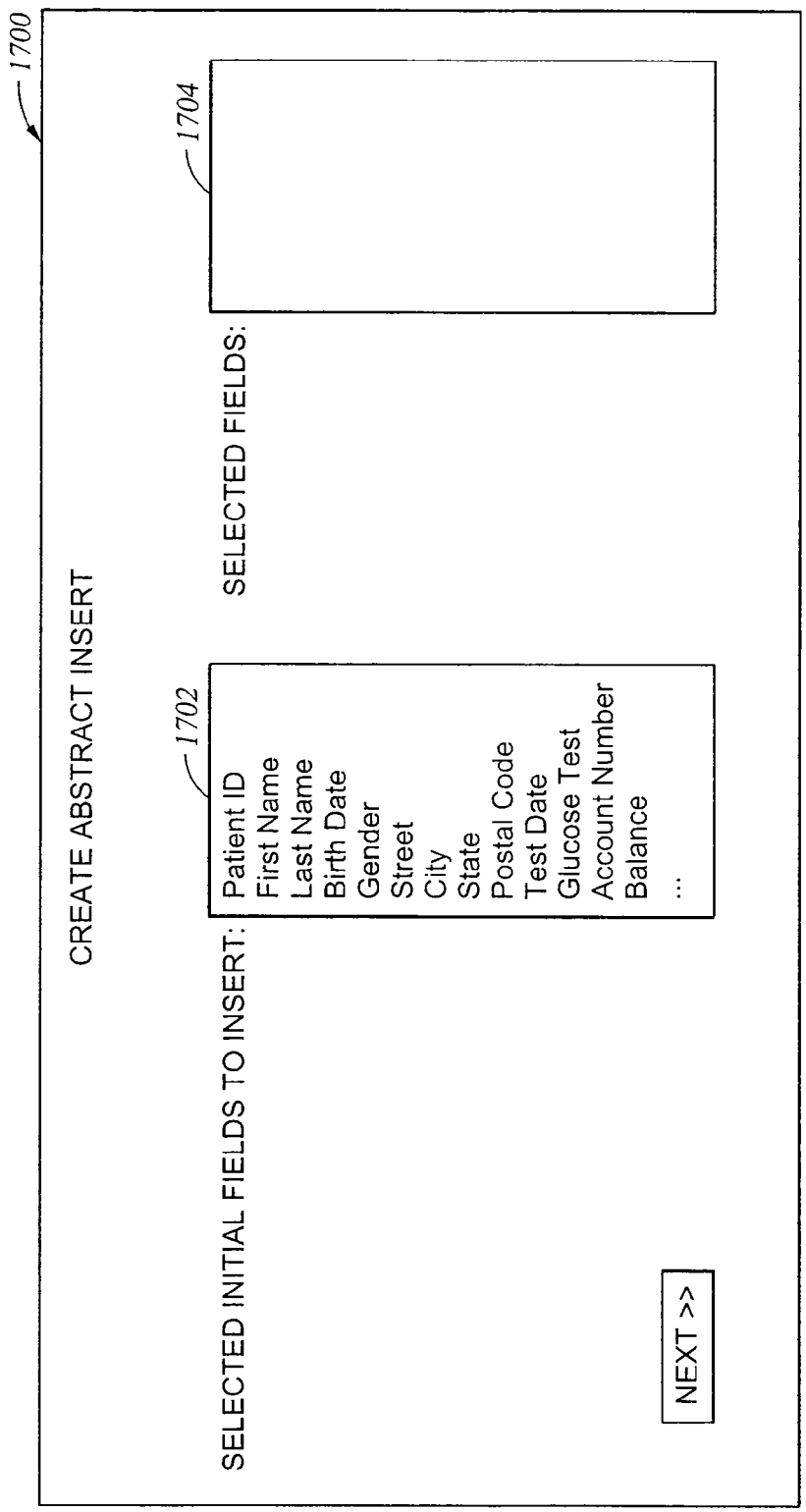
FIG. 17 is a user interface screen configured for building an abstract insert.

As noted above, aspects of the invention may "guide" the requesting entity 512 (i.e., the application 140) through the process of building an abstract modification operation. This aspect can be illustrated for an insert operation with reference to FIGS. 17-20 where HTML forms 160 (shown in FIG. 1) are intelligently populated to indicate characteristics of various fields. Referring first FIG. 17, a user interface screen 1700 is shown which may be displayed when a user elects create an abstract insert. The screen 1700 includes a menu 1702 of available logical fields which may be inserted into. The fields selected by the user from the menu 1702 are displayed in a "Selected Fields" field 1704, as shown in FIG. 18. In this example, the user has selected "Last Name" and "State". Upon making the desired selections, the user clicks the "Next" button 1706 to submit the selections and proceed to the next screen 1900 shown in FIG. 19. The screen 1900 is formatted with a plurality of input fields 1902A-I which are selected according to the logical fields specified by the user in the "Selected Fields" field 1704. That is, the selected fields "Last Name" and "State" are used as seed fields in determining which fields to display in the screen 1900. In this case, "Last Name" is a logical field 5103 corresponding to the "PatientInfo" table 520 for which the "First Name" logical field 5102, "Birth Date" logical field 5104 and "Gender" logical field 5106 are also specified as related logical fields.

As such, each of these logical fields is displayed as an input field (input fields 1902C, 1902E and 1902F, respectively) in the screen 1900. Similarly, the seed field "State" is used to identify the corresponding physical entity (i.e., AddressInfo table 521) and its related logical fields. Further, required fields (as defined by the presence of a required attribute 514 in the DRA 502) are marked with an asterisk (*). In this case, the input fields 1902A, 1902B and 1902C are marked as required fields. Further, generated in default fields are primed with the appropriate values. In the present example, the "Patient ID" input field 1902D is primed with a generated value. A default values not shown because none of the input fields 1902 correspond logical field specifications having a default attribute 518.

The user is then free to enter the desired values. An illustration of the input fields 1902 after having been populated with values is shown in FIG. 20. In this case, the user provided values for the required fields, and also elected to provide values for the optional fields.

Figure 10:
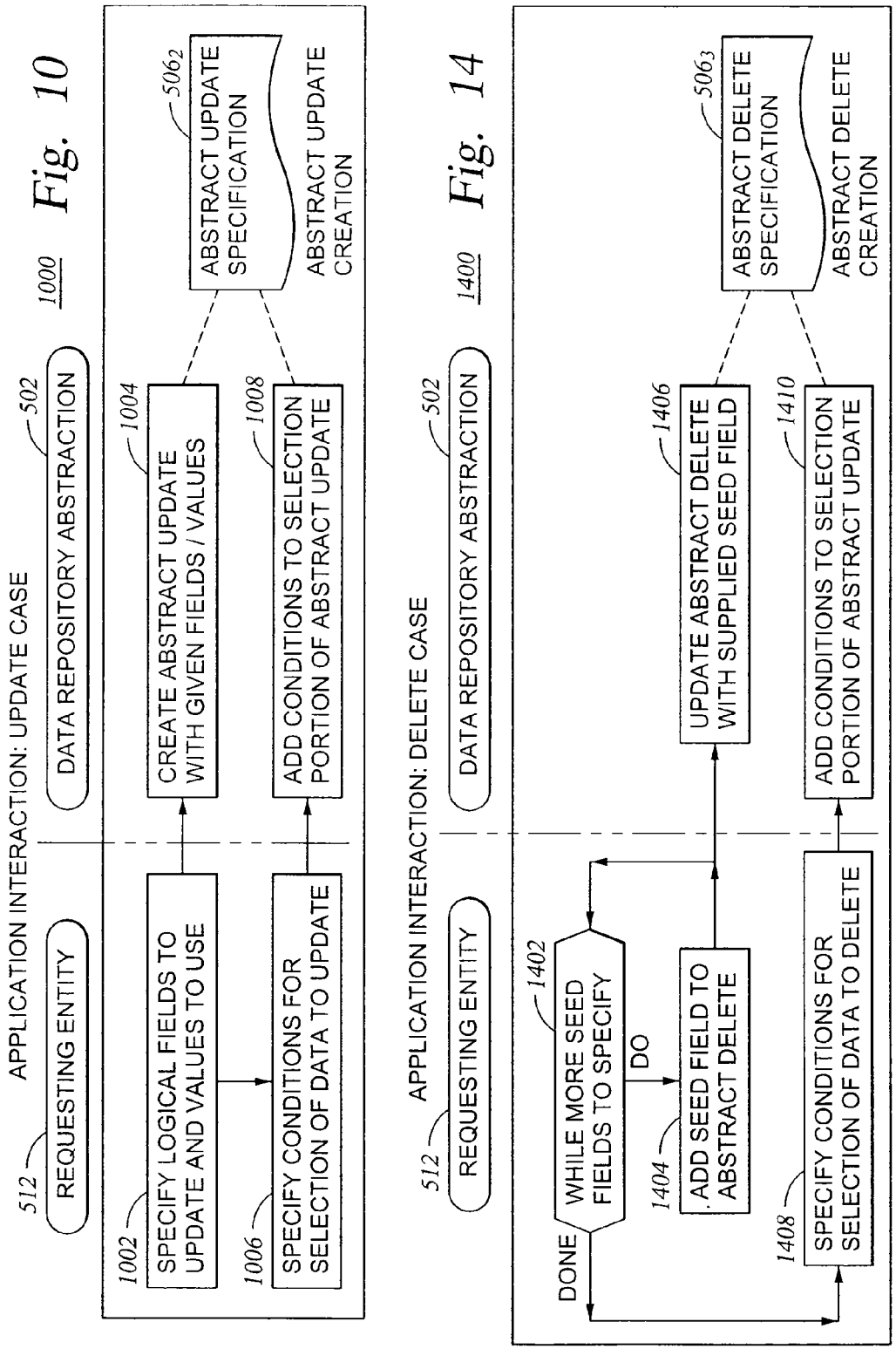
FIG. 10 is a flow chart illustrating the generation of an abstract update specification used to implement an update operation against physical data.

Referring now to FIG. 10 an abstract update method 1000 is described. Generally, the abstract update method 1000 describes the interaction between the requesting entity 512 and the data repository abstraction 502, which implements the abstract update. Initially, the requesting entity 512 specifies logical fields to update and values to use (step 1002). The fields and values may be provided to the requesting entity 512 by a user through a user interface. The data repository abstraction component 502 creates an abstract update specification 5062 according to the specified logical fields and values (step 1004). The requesting entity 512 then provides (at step 1006) the data repository abstraction component 502 conditions for selection of data to update (referred to herein as selection conditions). The selection conditions are added to the selection portion of the abstract update (step 1008). A fully composed abstract update specification 5062 is now ready for conversion to a physical operation, and subsequent execution.

One embodiment illustrating a method 1000 of converting, and then executing, the abstract update is described with reference to FIG. 11. The method 1100 is initiated by the requesting entity 512 which submits a request to execute the abstract update to the run-time component 150. In response, the run-time component 150 then performs processing to convert the abstract update to a physical update. The conversion process includes first grouping the fields of the abstract update specification 5062 according to the corresponding physical entities (step 1102). A series of steps is then entered performed for each field of each entity (loops entered at steps 1104 and 1106, respectively) which is to be updated, as specified by the abstract update specification 5062. The run-time component 150 then determines the physical location corresponding to the logical field from the data repository abstraction component 502 (step 1108). A physical location list 1112 is updated to reflect the physical location of the logical field (step 1110). If the logical field has an internal value (determined at step 1114), a value list 1120 is updated with the internal value for the field (step 1116). Otherwise, the value list 1120 is updated with the given value for the field (step 1118).

Once each of the logical fields to be updated are processed according to the loop entered at step 1106, selection logic is generated from the abstract selection (WHERE) conditions of the abstract update specification 5062 (step 1122). The run-time component 150 then builds a physical update statement from the physical location list 1112, the value location list 1120 and the selection logic (step 1124). The physical update statement is added to an update statement list 1128 (step 1126). The same processing is then performed for the next entity. The result of processing each of the entities referenced in the abstract update specification 5062 is an update statement list 1128 containing a physical update statement for each entity affected by the update. The update statement list 1128 is then sorted to ensure that the physical update statements are executed in the appropriate order (step 1130). The physical update is then executed (step 1132).

Figure 12:
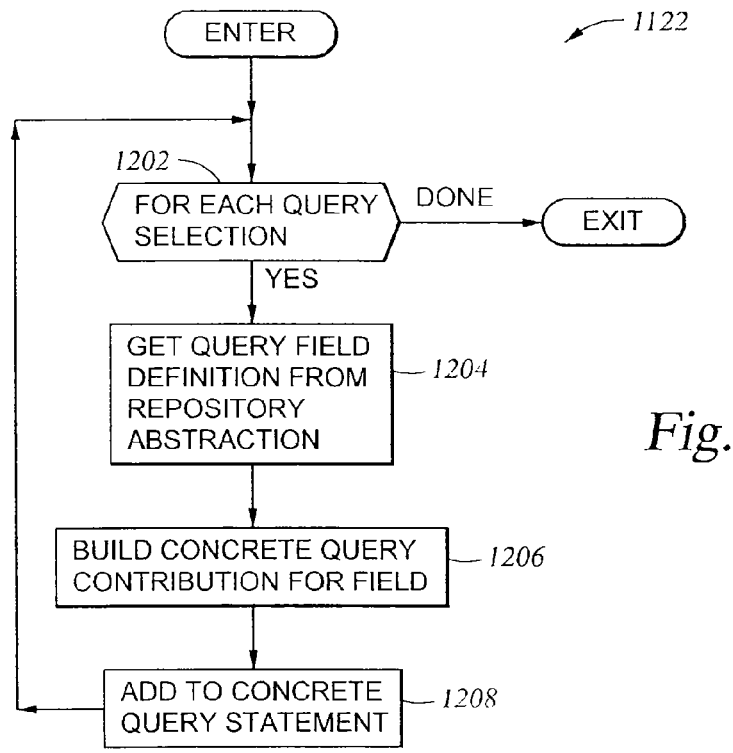
FIG. 12 is a flow chart illustrating the generation of selection logic for an abstract update operation.

One embodiment for generating the selection logic at step 1122 of the method 1100 is shown in FIG. 12. It is noted that step 1122 substantially involves performing steps 306, 308, 310 and 312 of FIG. 3. Accordingly, for each selection criterion (step 1202), the specified field definition is retrieved from the abstraction component 502 (step 1204). A concrete/physical selection contribution is built (step 1206) and then added to the selection portion of the update statement (step 1208). The logic for building the concrete/physical selection contribution is substantially the same as was described for queries with respect to FIG. 4 and, therefore, will not be described again in detail here.

Figure 11:
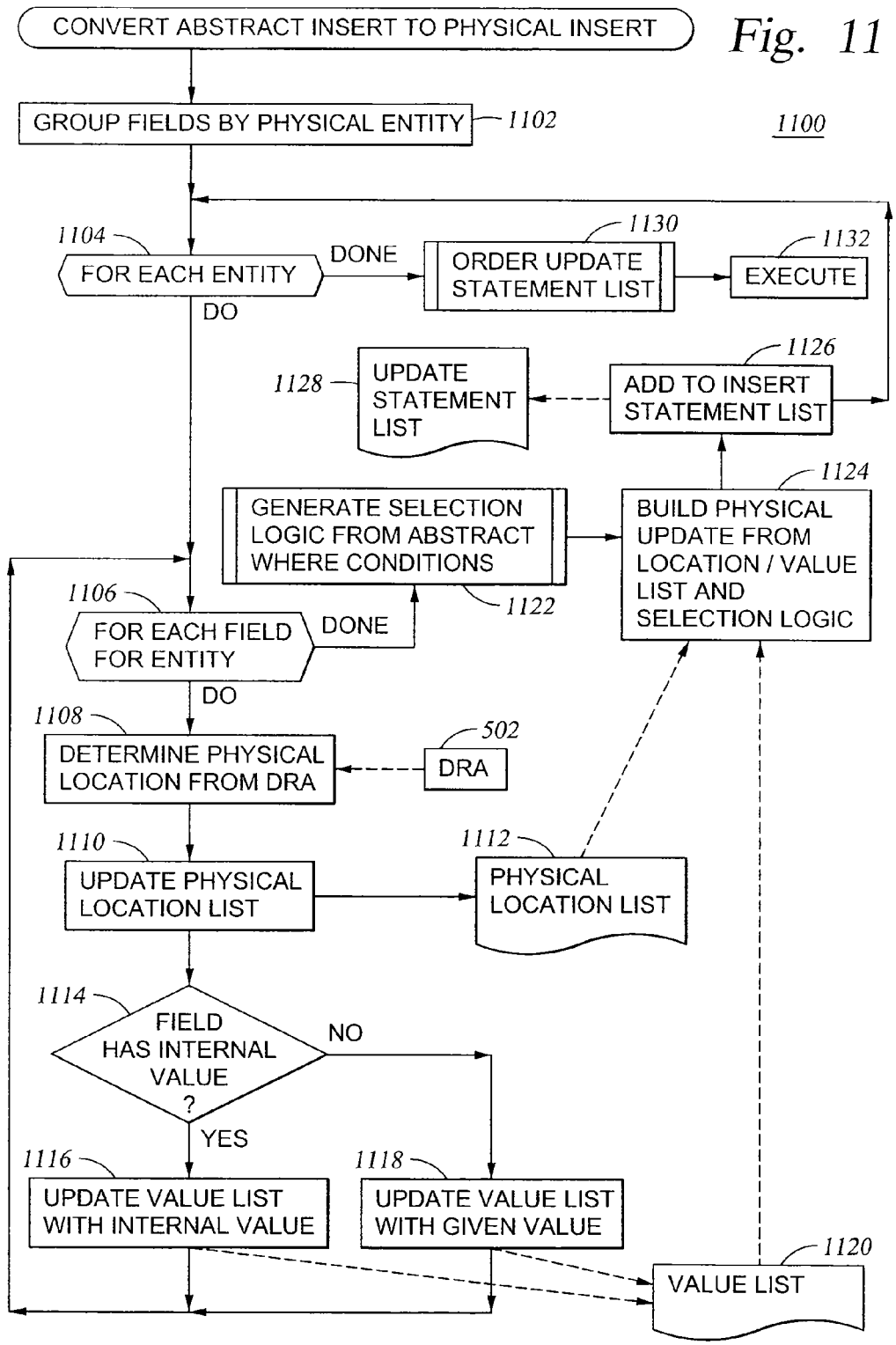
FIG. 11 is a flow chart illustrating the conversion of an abstract update operation to a physical update operation, which is then executed.
Figure 13:
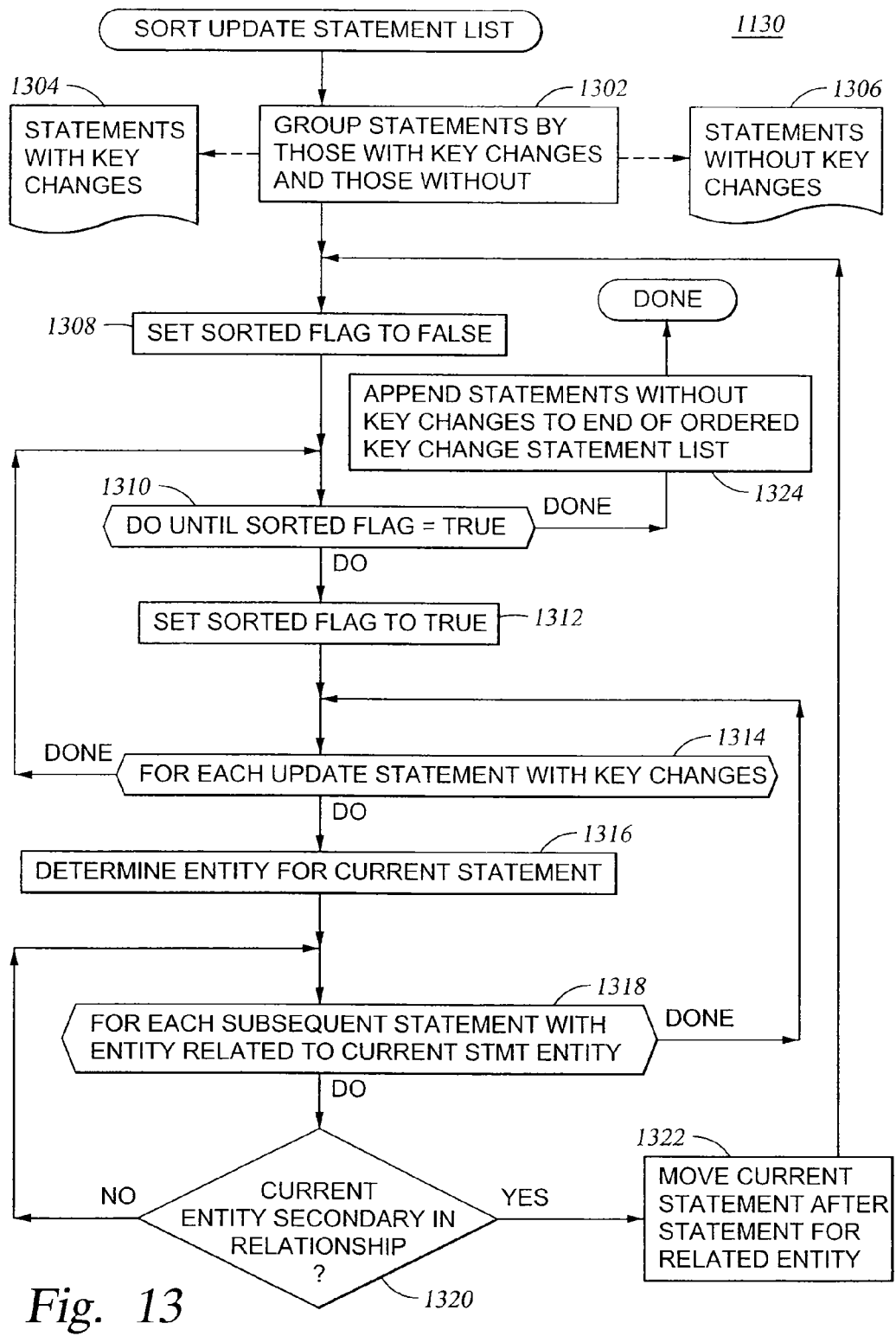
FIG. 13 is a flow chart illustrating sorting of an update statement list to ensure a proper order of execution.

An embodiment of the ordering performed at step 1130 of method 1100 in FIG. 11 is described with reference to FIG. 13. Initially, statements are grouped according to those with key changes (i.e., statements affecting fields having keys defined thereon) and those without key changes (step 1302). The grouping is accomplished by placing physical update statements with key changes in a first list 1304 and placing physical update statements without key changes in a second list 1306. A "sorted flag" is then set to False (step 1308). A series of steps are then performed for each update statement in the first list 1304 until the "sorted flag" is set to True (steps 1310, 1312 and 1314). Specifically, for a given update statement in the first list 1304 (beginning with the first update statement in the list), the corresponding entity is determined (step 1316). Then, the relationship between the corresponding entity of the given update statement and each related entity of the remaining update statements in the list 1304 is determined (step 1318 and 1320). Specifically, the run-time component 150 determines (with respect to the physical entity relationships specification 526) whether the entity of the given update statement is a secondary entity with respect to a primary related entity of another update statement (step 1320). If so, the given update statement is moved to a position after the insert statement of the related entity (step 1322). This process is repeated until the first list 1304 is traversed without encountering a current entity which is secondary with respect to an entity of a subsequent statement in the list 1304. At this point, the physical update statements in the list 1304 are ordered according to the hierarchical relationship specified in the physical entity relationships specification 526. This process ensures that a primary entity containing a primary key of a primary/foreign key pair is affected first, before the secondary entity containing the foreign key. Having sorted the first list 1304, the statements in the second list 1306 (i.e., those statements without key changes) are appended to the end of the ordered first list 1304 (step 1324). Collectively, these statements define the appropriately ordered update statement list 1128 which is executed at step 1132 of the method 1100 shown in FIG. 11.

Referring now to FIG. 14 an abstract delete method 1400 is described. Generally, the method 1400 describes the interaction between the requesting entity 512 and the data repository abstraction 502, which implements the abstract delete. As in each of the previous abstract modification operations, the abstract delete requires composing an abstract specification. To this end, the requesting entity 512 specifies one or more seed fields (steps 1402 and 1404) which the data repository abstraction component 502 uses to create/update abstract delete logic of the abstract delete specification 5063 (step 1406). The requesting entity 512 then provides selection conditions for selection of data to delete (step 1408). The selection conditions are added to the selection portion of the abstract delete specification 5063 (step 1410).

Figure 15:
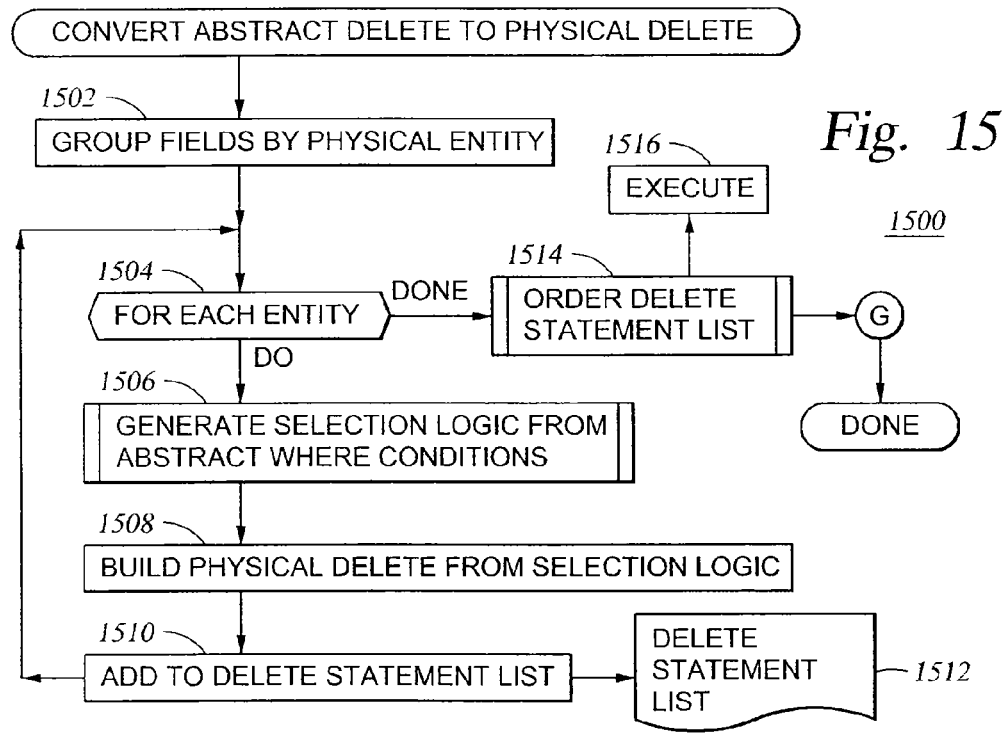
FIG. 15 is a flow chart illustrating the conversion of an abstract delete operation to a physical delete operation.

The abstract delete specification is then used by the run-time component 150 to generate an executable physical delete specification. One conversion method 1500 for converting the abstract delete to a physical delete, is described with reference to FIG. 15. The conversion process is initiated when the requesting entity 512 submits a request to execute the delete operation. The run-time component 150 first groups the specified seed fields according to their respective physical entity (step 1502). That is, the run-time component 150 uses the seed value (specified by the requesting entity 512 at step 1402) and the data repository abstraction component 502 to locate the physical entity to delete from. In particular, the logical field specification of the data repository abstraction component 502 corresponding to the seed field is identified. The identified logical field specification provides the necessary logic (i.e., the appropriate access method) to access the physical entity to delete from. For each physical entity (step 1504), the run-time component 150 generates selection logic according to the selection conditions specified in the abstract delete specification 5063 (step 1506). One embodiment for generating the selection logic is described with reference to FIG. 12. FIG. 12 was described above in the context of an update operation. Because the processing for a delete operation is substantially similar, the details of FIG. 12 are not described again with respect to a delete operation. Using the determined physical entity and the generated selection logic, the run-time component 150 builds a physical delete statement (step 1508) which is added to a delete statement list 1512 (step 1510). The statements in the delete statement list 1512 are then ordered (step 1514) and executed (step 1516).

Figure 16:
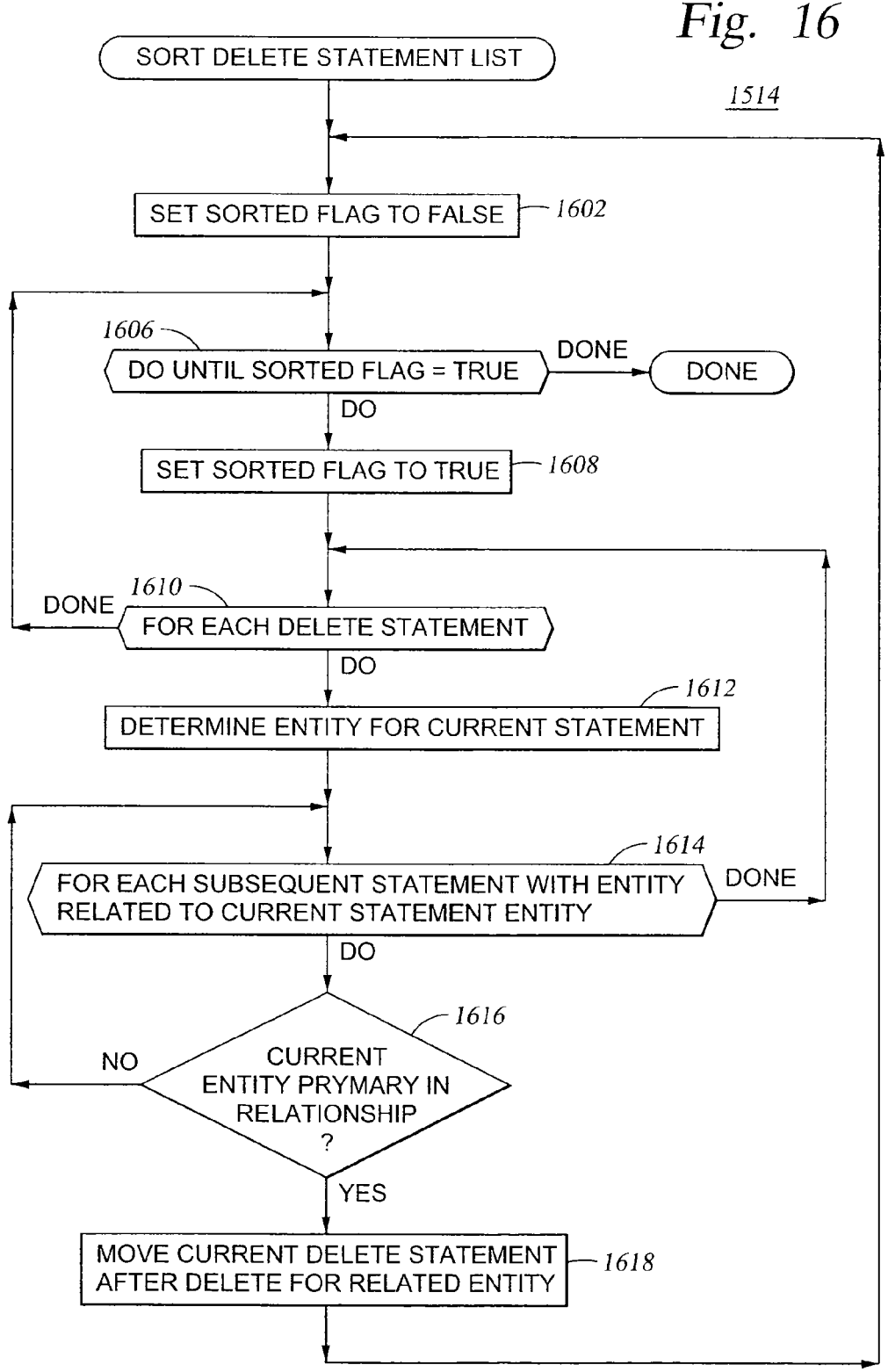
FIG. 16 is a flow chart illustrating sorting of a delete statement list to ensure a proper order of execution.

One embodiment of the ordering performed at step 1514 is described with reference to FIG. 16. Initially, a "sorted flag" is set to False (step 1602). A series of steps are then performed for each delete statement in the delete statement list 1512 until the "sorted flag" is set to True (steps 1606, 1608 and 1610). Specifically, for a given delete statement in the delete statement list 1512 (beginning with the first delete statement in the list), the corresponding entity is determined (step 1612). Then, the relationship between the corresponding entity of the given insert statement and each related entity of the remaining delete statements in the delete statement list 1512 is determined (step 1614 and 1616). Specifically, the run-time component 150 determines (with respect to the physical entity relationships specification 526) whether the entity of the given delete statement is a primary entity with respect to a secondary related entity of another delete statement (step 1616). If so, the given delete statement is moved to a position after the delete statement of the related entity (step 1618). This process is repeated until the delete statement list 1512 can be traversed without encountering a current entity which is primary with respect to an entity of a subsequent statement in the delete statement list 1512. At this point, the physical delete statements in the delete statement list 1512 are ordered according to the interrelationship specified in the physical entity relationships specification 526. This process ensures that a primary entity containing a primary key of a primary/foreign key pair is deleted last, after the secondary entity (containing the foreign key) is deleted.

It should be noted that the embodiments described above are merely illustrative and not exclusive. Persons skilled in the art will recognize other embodiments within the scope of the invention. For example, the foregoing describes an embodiment in which order dependencies are defined as part of the abstract data representation component 148 (i.e., order dependencies are defined in the physical entity relationships specification 526). Thus, changes in order dependencies require changes in the abstract data representation, but allow the application to be used without changes. An alternative embodiment provides for a less rigid definition of order dependencies by allowing for a higher degree of automation in the determination dependencies. That is, given the physical entity relationships specification 526 defined in an abstract data representation, the sequencing of operations could be determined dynamically by applying a rule set such as the following: (i) insert operations involving a key field need to insert into the primary entity before any related entities; (ii) update operations involving a key field could be restricted or automatically propogated from the primary entity first followed by all related entities; (iii) delete operations involving a row that includes a key field could be restricted or automatically propogated from the secondary entities to the primary entity; and (iv) operations for completely unrelated entities would be executed in any order.

In still another embodiment, it is contemplated that the database is checked for referential integrity cascade operations. In this case, the database itself handles some of the work and allows DRA 148 to effectively 'ignore' those low level operations, and only perform the high level ones. As such, this invention can 'patch' referential integrity holes in legacy databases that may no longer be fixable at the database layer because of assumptions built into legacy applications that use the database.

While the foregoing is directed to embodiments of the present invention, other and further embodiments of the invention may be devised without departing from the basic scope thereof, and the scope thereof is determined by the claims that follow.

What is claimed is:

1. A non-transitory computer-readable storage medium containing a program which, when executed by a processor, performs operations causing modification of physical data comprising a plurality of physical entities and having a particular physical data representation in a database, the operations causing modification of physical data comprising:

generating a single abstract modification specification abstractly defining modification operations to modify the physical data, wherein the abstract modification specification comprises a respective logical value for a plurality of logical fields corresponding to physical entities of the database;

transforming the abstract modification specification into at least two physical modification statements consistent with the particular physical data representation according to logical field definitions for each of the plurality of logical fields, wherein:

each logical field definition includes a reference to at least one access method, the at least one access method is selected for a simple access method, a filtered access method, or a composed access method, and each of the at least two physical modification statements modifies a different physical entity of the physical data;

ordering the at least two physical modification statements; and executing the modification operations according to the physical modification statements, whereby the physical data is modified.

2. The computer-readable storage medium of claim 1, wherein the ordering is performed according to a physical entity relationships specification defining interrelationships between the physical entities of the physical data.

3. The computer-readable storage medium of claim 1, wherein the abstract modification specification comprises at least two logical fields corresponding to at least two physical entities to be modified and selection criteria for locating the at least the two physical entities.

4. The computer-readable storage medium of claim 1, each access method describes a physical location of a physical entity.

5. The computer-readable storage medium of claim 1, wherein the modification operations are insert operations and wherein generating the abstract modification specification, comprises:

specifying at least two logical seed fields;

determining required logical fields for performing the insert operations based on the at least two logical seed fields; and receiving values for each of the required logical fields.

6. The computer-readable storage medium of claim 5, wherein each required field is a field requiring input because no default value is defined for the field, no algorithm to generate a value for the field is provided and the value for the field cannot be null.

7. The computer-readable storage medium of claim 5, wherein the logical field definitions are part of an abstract data model comprising a plurality of logical field definitions for each of the logical fields wherein each logical field definition in the abstract data model relates a respective logical field name to a physical entity of the database and specifies a respective access method for accessing the physical entity and wherein determining required logical fields based on the logical seed fields is done with reference to the abstract data model.

8. The computer-readable storage medium of claim 5, further comprising:

determining optional logical fields for performing the insert operations based on the at least two logical seed fields;

formatting a user interface to visually distinguish between the required logical fields and the optional logical fields; and receiving values for at least each of the required logical fields.

9. The computer-readable storage medium of claim 5, further comprising determining optional logical fields for performing the insert operations based on the at least two logical seed fields.

10. The computer-readable storage medium of claim 9, further comprising formatting a user interface to visually distinguish between the required logical fields and the optional logical fields.

11. The computer-readable storage medium of claim 9, wherein the optional logical fields comprise fields which do not require input from a requesting entity responsible for requesting generation of the single abstract modification specification.

12. The computer-readable storage medium of claim 5, wherein transforming the abstract modification specification comprises determining a corresponding physical location of data for each of the required logical fields and the logical seed fields.

13. The computer-readable storage medium of claim 12, wherein the logical field definitions are part of an abstract data model comprising a plurality of logical field definitions for each of the logical fields wherein each logical field definition in the abstract data model relates a respective logical field name to a physical entity of the database and specifies a respective access method for accessing the physical entity and wherein determining the corresponding physical location of data for each of the required logical fields and the logical seed fields is done with reference to the abstract data model.

14. The computer-readable storage medium of claim 1, wherein at least one of the modification operations is an update operation and wherein generating the abstract modification specification, comprises:
specifying at least two logical fields to update and corresponding values;
creating an abstract update expression using the specified logical fields to update and the corresponding value;
specifying a selection condition for selecting data to update; and
adding the selection condition to the abstract update expression.

15. The computer-readable storage medium of claim 14, wherein transforming the abstract modification specification comprises determining a corresponding physical location of data for each of the specified logical fields.

16. The computer-readable storage medium of claim 15, wherein the logical field definitions are part of an abstract data model comprising a plurality of logical field definitions for each of the logical fields wherein each logical field definition in the abstract data model relates a respective logical field name to a physical entity of the database and specifies a respective access method for accessing the physical entity and wherein determining the corresponding physical location of data for the specified logical fields is done with reference to the abstract data model.

17. The computer-readable storage medium of claim 1, wherein at least one of the modification operations is a delete operation and wherein generating the abstract modification specification, comprises:
specifying at least two logical seed fields to delete;
creating an abstract delete expression using the specified logical seed fields;
specifying a selection condition for selecting data to delete; and
adding the selection condition to the abstract delete expression.

18. The computer-readable storage medium of claim 17, wherein transforming the abstract modification specification comprises determining a corresponding physical location of data for the specified logical seed fields.

19. The computer-readable storage medium of claim 18, wherein the logical field definitions are part of an abstract data model comprising a plurality of logical field definitions for each of the logical fields wherein each logical field definition in the abstract data model relates a respective logical field name to a physical entity of the database and specifies a respective access method for accessing the physical entity and wherein determining the corresponding physical location of data for the specified logical fields is done with reference to the abstract data model.

20. A non-transitory computer-readable storage medium containing a program which, when executed by a processor, causes execution of a method comprising:
providing an abstract model for defining abstract modification specifications logically describing operations to modify the physical data, the abstract model comprising:
(i) a plurality of logical field definitions, each logical field definition comprising a reference to at least one access method, wherein:
the at least one access method is configured to associate the respective logical field definition to a physical data representation, and
the at least access method is selected from a simple access method, a filtered access method, or a composed access method; and
(ii) a physical entity relationships specification defining interrelationships between the physical entities of the physical data; and providing a run-time component configured to:
(i) transform, according to the abstract model, each abstract modification specification into at least two physical modification statements consistent with the physical data, wherein each of the at least two physical modification statements modifies the physical data defining a different physical entity; wherein the abstract modification specifications include logical values and references to logical field definitions; and
(ii) order the at least two physical modification statements according to the physical entity relationships specification.

21. The computer-readable storage medium of claim 20, wherein the abstract modification specification comprises a plurality of logical field names and corresponding values.

22. The computer-readable storage medium of claim 20, wherein the at least two physical modification statements are selected from one of insert, update and delete statements.

23. A computer, comprising:
a memory containing a program; and
at least one processor;
the program, which when executed on the processor, is configured to provide a logical framework for defining abstract modification operations for modifying physical data, the logical framework comprising:
an abstract model for defining a plurality of abstract modification statements each logical describing an operation to modify the physical data, the abstract model comprising:
(i) a plurality of logical field definitions, each logical field definition comprising a reference to at least one access method, wherein:
the at least one access method is configured to associate the respective logical field definition to a physical data representation, and
the at least one access method is selected from a simple access method, a filtered access method, or a composed access method; and
(ii) a physical entity relationships specification defining interrelationships between the physical entities of the physical data; and
a run-time component to transform, according to the abstract model, each abstract modification specification into at least two physical modification statements consistent with the physical data and to order the at least two physical modification statements according to the physical entity relationships specification, wherein each of the at least two physical modifications statements modifies the physical data defining a different physical entity of the physical data; wherein the abstract modification specifications include logical values and references to logical field definitions.

24. The computer of claim 23, wherein the at least two physical modification statements are selected from one of insert, update and delete statements.

25. The computer of claim 23, wherein the logical field definitions each describes a location of a respective physical entity of the physical data.

* * * * *